US007290472B2

(12) United States Patent
Gass et al.

(10) Patent No.: US 7,290,472 B2
(45) Date of Patent: Nov. 6, 2007

(54) MITER SAW WITH IMPROVED SAFETY SYSTEM

(75) Inventors: Stephen F. Gass, Wilsonville, OR (US); J. David Fulmer, Tualatin, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 10/932,339

(22) Filed: Sep. 1, 2004

(65) Prior Publication Data

US 2005/0204885 A1 Sep. 22, 2005

Related U.S. Application Data

(63) Continuation of application No. 10/047,066, filed on Jan. 14, 2002, now Pat. No. 6,945,148, and a continuation of application No. 10/050,085, filed on Jan. 14, 2002, now abandoned.

(51) Int. Cl.
*B27B 5/29* (2006.01)
*B27B 3/28* (2006.01)
*B23D 45/04* (2006.01)

(52) U.S. Cl. ........................ 83/62.1; 83/477.2; 83/490; 83/581; 83/471.3; 83/397.1

(58) Field of Classification Search ............... 83/477.1, 83/397.1, DIG. 11, 581, 666, 62.1, 72, 471.3, 83/477.2, 473, 488, 490, 58, 62, 76.7, 471.2, 83/478, 481, 485, 487, 489, 574, 821, 823, 83/827, 828, 954, 481.665, 522, 11, 22, 589, 83/DIG. 1, 544, 491, 326, 76.8, 546, 397, 83/476, 526; 30/380-381, 388, 373, 370-371, 30/390; 451/1, 6, 9, 119, 158, 177; 144/382, 144/356, 154.5, 363, 365, 117.1, 118, 154; 188/1.11 R, 1.11 E, 71.8, 82.7, 376, 82.74, 188/82.77; 192/15, 17 C, 129 R, 133, 144, 192/710, 142 R, 130; 241/37.5; 125/13.01
See application file for complete search history.

(56) References Cited

U.S. PATENT DOCUMENTS 0,146,886 A 1/1874 Doane et al.

(Continued)

FOREIGN PATENT DOCUMENTS

CA 2140991 A * 9/1995

(Continued)

OTHER PUBLICATIONS

Gordon Engineering Corp., Product Catalog, Oct. 1997, pp. cover, 1, 3 and back, Brookfield, Connecticut, US.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
*You Should Have Invented It*, French television show video.
Analog Devices, Inc., 3-Axis Capacitive Sensor—Preliminary Technical Data AD7103, pp. 1-40, © 1998.

(Continued)

*Primary Examiner*—Boyer D. Ashley
*Assistant Examiner*—Ghassem Alie

(57) ABSTRACT

Miter saws are disclosed having a base, a blade supported by the base, a detection system adapted to detect a dangerous condition between a person and the blade, and a reaction system associated with the detection system to cause a predetermined action to take place upon detection of the dangerous condition. The blade is rotatable, and moves into a cutting zone to cut a workpiece. The predetermined action may be to stop the blade from rotating, to create an impulse against movement of the blade into the cutting zone, or to cause the blade to move away from the cutting zone.

16 Claims, 13 Drawing Sheets

U.S. PATENT DOCUMENTS 0,162,814 A 5/1875 Graves et al.
0,261,090 A 7/1882 Grill
0,264,412 A 9/1882 Kuhlmann
0,299,480 A 5/1884 Kuhlmann et al.
0,302,041 A 7/1884 Sill
0,307,112 A 10/1884 Groff
0,509,253 A 11/1893 Shields
0,545,504 A 9/1895 Hoover
0,869,513 A 10/1907 Pfeil
0,941,726 A 11/1909 Pfalzgraf
0,982,312 A 1/1911 Swafford
0,997,720 A 7/1911 Troupenat
1,037,843 A 9/1912 Ackley
1,050,649 A 1/1913 Harrold et al.
1,054,558 A 2/1913 Jones
1,074,198 A 9/1913 Phillips
1,082,870 A 12/1913 Humason
1,101,515 A 6/1914 Adam
1,126,970 A 2/1915 Folmer
1,132,129 A 3/1915 Stevens
1,148,169 A 7/1915 Howe
1,154,209 A 9/1915 Rushton
1,205,246 A 11/1916 Mowry
1,228,047 A 5/1917 Reinhold
1,240,430 A 9/1917 Erickson
1,244,187 A 10/1917 Frisbie
1,255,886 A 2/1918 Jones
1,258,961 A 3/1918 Tattersall
1,311,508 A 7/1919 Harrold
1,324,136 A 12/1919 Turner
1,381,612 A 6/1921 Anderson
1,397,606 A 11/1921 Smith
1,427,005 A 8/1922 McMichael
1,430,983 A 10/1922 Granberg
1,450,906 A 4/1923 Anderson
1,464,924 A 8/1923 Drummond
1,465,224 A 8/1923 Lantz
1,492,145 A 4/1924 Talley
1,496,212 A 6/1924 French
1,511,797 A 10/1924 Berghold
1,526,128 A 2/1925 Flohr
1,527,587 A 2/1925 Hutchinson
1,551,900 A 9/1925 Morrow
1,553,996 A 9/1925 Federer
1,582,483 A 4/1926 Runyan
1,590,988 A 6/1926 Campbell
1,600,604 A 9/1926 Sorlien
1,616,478 A 2/1927 Watson
1,640,517 A 8/1927 Procknow
1,662,372 A 3/1928 Ward
1,668,061 A 5/1928 Falkins
1,701,948 A 2/1929 Crowe
1,711,490 A 5/1929 Drummond
1,712,828 A 5/1929 Klehm
1,774,521 A 9/1930 Neighbour
1,807,120 A 5/1931 Lewis
1,811,066 A 6/1931 Tannewitz
1,879,280 A 9/1932 James
1,896,924 A 2/1933 Ulrich
1,902,270 A 3/1933 Tate
1,904,005 A 4/1933 Masset
1,910,651 A 5/1933 Tautz
1,938,548 A 12/1933 Tautz
1,938,549 A 12/1933 Tautz
1,963,688 A 6/1934 Tautz
1,988,102 A 1/1935 Woodward
1,993,219 A 3/1935 Merrigan
2,007,887 A 7/1935 Tautz
2,010,851 A 8/1935 Drummond
2,020,222 A 11/1935 Tautz
2,038,810 A 4/1936 Tautz
2,075,282 A 3/1937 Hedgpeth
2,095,330 A 10/1937 Hedgpeth
2,106,288 A 1/1938 Tautz
2,106,321 A 1/1938 Guertin
2,121,069 A 6/1938 Collins
2,131,492 A 9/1938 Ocenasek
2,163,320 A 6/1939 Hammond
2,168,282 A 8/1939 Tautz
2,241,556 A 5/1941 MacMillin et al.
2,261,696 A 11/1941 Ocenasek
2,265,407 A 12/1941 Tautz
2,286,589 A 6/1942 Tannewitz
2,292,872 A 8/1942 Eastman
2,299,262 A 10/1942 Uremovich
2,312,118 A 2/1943 Neisewander
2,313,686 A 3/1943 Uremovich
2,328,244 A 8/1943 Woodward
2,352,235 A 6/1944 Tautz
2,377,265 A 3/1945 Rady
2,392,486 A * 1/1946 Larsen ....................... 29/76.1
2,402,232 A 6/1946 Baker
2,425,331 A 8/1947 Kramer
2,434,174 A * 1/1948 Morgan ...................... 83/62.1
2,452,589 A 11/1948 McWhirter et al.
2,466,325 A 4/1949 Ocenasek
2,496,613 A 2/1950 Woodward
2,501,134 A 3/1950 Meckoski et al.
2,509,813 A 5/1950 Dineen
2,517,649 A 8/1950 Frechtmann
2,518,684 A 8/1950 Harris
2,530,290 A 11/1950 Collins
2,554,124 A 5/1951 Salmont
2,562,396 A 7/1951 Schutz
2,572,326 A 10/1951 Evans
2,590,035 A 3/1952 Pollak
2,593,596 A 4/1952 Olson
2,601,878 A 7/1952 Anderson
2,623,555 A 12/1952 Eschenburg
2,625,966 A 1/1953 Copp
2,626,639 A 1/1953 Hess
2,661,777 A 12/1953 Hitchcock
2,661,780 A 12/1953 Morgan
2,675,707 A 4/1954 Brown
2,678,071 A 5/1954 Odlum et al.
2,690,084 A 9/1954 Van Dam
2,695,638 A 11/1954 Gaskell
2,704,560 A 3/1955 Woessner
2,711,762 A 6/1955 Gaskell
2,719,547 A 10/1955 Gjerde
2,722,246 A 11/1955 Arnoldy
2,731,049 A 1/1956 Akin
2,736,348 A 2/1956 Nelson
2,737,213 A 3/1956 Richards et al.
2,758,615 A 8/1956 Mastriforte
2,785,710 A * 3/1957 Mowery, Jr. ................... 83/68
2,786,496 A 3/1957 Eschenburg
2,804,890 A 9/1957 Fink
2,810,408 A 10/1957 Boice et al.
2,839,943 A 6/1958 Caldwell et al.
2,844,173 A 7/1958 Gaskell
2,850,054 A 9/1958 Eschenburg
2,852,047 A 9/1958 Odlum et al.
2,873,773 A 2/1959 Gaskell
2,876,809 A * 3/1959 Rentsch et al. ............... 30/380
2,883,486 A 4/1959 Mason
2,894,546 A 7/1959 Eschenburg
2,913,025 A 11/1959 Richards
2,913,581 A 11/1959 Simonton et al.
2,937,672 A 5/1960 Gjerde
2,945,516 A 7/1960 Edgemond, Jr. et al.
2,954,118 A 9/1960 Anderson
2,957,166 A 10/1960 Gluck
2,978,084 A 4/1961 Vilkaitis 2,984,268 A 5/1961 Vuichard
2,991,593 A 7/1961 Cohen
3,005,477 A 10/1961 Sherwen
3,011,529 A 12/1961 Copp
3,011,610 A 12/1961 Stiebel et al.
3,013,592 A 12/1961 Ambrosio et al.
3,021,881 A 2/1962 Edgemond, Jr. et al.
3,035,995 A 5/1962 Seeley et al.
3,047,116 A 7/1962 Stiebel et al.
3,085,602 A 4/1963 Gaskell
3,105,530 A 10/1963 Peterson
3,129,731 A 4/1964 Tyrrell
3,163,732 A 12/1964 Abbott
3,184,001 A 5/1965 Reinsch et al.
3,186,256 A 6/1965 Reznick
3,207,273 A 9/1965 Jurin
3,213,731 A 10/1965 Renard
3,224,474 A * 12/1965 Bloom ........................ 30/374
3,232,326 A 2/1966 Speer et al.
3,246,205 A 4/1966 Miller
3,249,134 A 5/1966 Vogl et al.
3,274,876 A 9/1966 Debus
3,276,497 A 10/1966 Heer
3,306,149 A 2/1967 John
3,313,185 A 4/1967 Drake et al.
3,315,715 A 4/1967 Mytinger
3,323,814 A 6/1967 Phillips
3,337,008 A 8/1967 Trachte
3,356,111 A 12/1967 Mitchell
3,368,596 A 2/1968 Comer
3,386,322 A 6/1968 Stone et al.
3,439,183 A 4/1969 Hurst, Jr.
3,445,835 A 5/1969 Fudaley
3,454,286 A 7/1969 Anderson et al.
3,456,696 A 7/1969 Gregory et al.
3,512,440 A 5/1970 Frydmann
3,538,964 A 11/1970 Warrick et al.
3,540,338 A 11/1970 McEwan et al.
3,554,067 A 1/1971 Scutella
3,566,996 A 3/1971 Crossman
3,580,376 A 5/1971 Loshbough
3,581,784 A 6/1971 Warrick
3,593,266 A 7/1971 Van Sickle
3,613,748 A 10/1971 De Pue
3,621,894 A * 11/1971 Niksich ....................... 30/380
3,670,788 A 6/1972 Pollak et al.
3,675,444 A 7/1972 Whipple
3,680,609 A 8/1972 Menge
3,688,815 A 9/1972 Ridenour
3,695,116 A 10/1972 Baur
3,696,844 A 10/1972 Bernatschek
3,716,113 A 2/1973 Kobayashi et al.
3,719,103 A 3/1973 Streander
3,745,546 A 7/1973 Struger et al.
3,749,933 A 7/1973 Davidson
3,754,493 A 8/1973 Niehaus et al.
3,772,590 A 11/1973 Mikylecky et al.
3,785,230 A 1/1974 Lokey
3,793,915 A 2/1974 Hujer
3,805,639 A 4/1974 Peter
3,805,658 A 4/1974 Scott et al.
3,808,932 A 5/1974 Russell
3,829,850 A 8/1974 Guetersloh
3,829,970 A * 8/1974 Anderson .................... 30/380
3,858,095 A 12/1974 Friemann et al.
3,861,016 A 1/1975 Johnson et al.
3,863,208 A 1/1975 Balban
3,880,032 A 4/1975 Green
3,882,744 A 5/1975 McCarroll
3,886,413 A 5/1975 Dow et al.
3,889,567 A 6/1975 Sato et al.
3,905,263 A 9/1975 Smith
3,922,785 A 12/1975 Fushiya
3,924,688 A 12/1975 Cooper et al.
3,931,727 A 1/1976 Luenser
3,935,777 A 2/1976 Bassett
3,945,286 A 3/1976 Smith
3,946,631 A 3/1976 Malm
3,947,734 A 3/1976 Fyler
3,949,636 A 4/1976 Ball et al.
3,953,770 A 4/1976 Hayashi
3,960,310 A 6/1976 Nussbaum
3,967,161 A 6/1976 Lichtblau
3,974,565 A * 8/1976 Ellis ............................ 30/376
3,975,600 A 8/1976 Marston
3,978,624 A 9/1976 Merkel et al.
3,994,192 A 11/1976 Faig
4,007,679 A 2/1977 Edwards
4,016,490 A 4/1977 Weckenmann et al.
4,026,174 A 5/1977 Fierro
4,026,177 A 5/1977 Lokey
4,029,159 A 6/1977 Nymann
4,047,156 A 9/1977 Atkins
4,048,886 A 9/1977 Zettler
4,060,160 A 11/1977 Lieber
4,070,940 A 1/1978 McDaniel et al.
4,075,961 A 2/1978 Harris
4,077,161 A 3/1978 Wyle et al.
4,085,303 A 4/1978 McIntyre et al.
4,090,345 A 5/1978 Harkness
4,091,698 A 5/1978 Obear et al.
4,106,378 A * 8/1978 Kaiser ........................... 83/74
4,117,752 A 10/1978 Yoneda
4,145,940 A 3/1979 Woloveke et al.
4,152,833 A 5/1979 Phillips
4,161,649 A 7/1979 Klos et al.
4,175,452 A 11/1979 Idel
4,184,394 A 1/1980 Gjerde
4,190,000 A 2/1980 Shaull et al.
4,195,722 A 4/1980 Anderson et al.
4,199,930 A 4/1980 Lebet et al.
4,200,002 A * 4/1980 Takahashi .................... 74/530
4,206,666 A 6/1980 Ashton
4,206,910 A 6/1980 Biesemeyer
4,249,117 A 2/1981 Leukhardt et al.
4,249,442 A 2/1981 Fittery
4,262,278 A 4/1981 Howard et al.
4,267,914 A 5/1981 Saar
4,270,427 A 6/1981 Colberg et al.
4,276,459 A 6/1981 Willett et al.
4,276,799 A 7/1981 Muehling
4,291,794 A 9/1981 Bauer
4,305,442 A 12/1981 Currie
4,319,146 A 3/1982 Wires, Sr.
4,321,841 A 3/1982 Felix
4,334,450 A 6/1982 Benuzzi
4,372,202 A 2/1983 Cameron
4,385,539 A 5/1983 Meyerhoefer et al.
4,391,358 A 7/1983 Haeger
4,418,597 A 12/1983 Krusemark et al.
4,427,042 A 1/1984 Mitchell et al.
4,466,170 A * 8/1984 Davis .......................... 29/561
4,466,233 A 8/1984 Thesman
4,470,046 A 9/1984 Betsill
4,503,739 A 3/1985 Konieczka
4,510,489 A 4/1985 Anderson, III et al.
4,512,224 A 4/1985 Terauchi
4,518,043 A 5/1985 Anderson et al.
4,532,501 A 7/1985 Hoffman
4,532,844 A 8/1985 Chang et al.
4,557,168 A 12/1985 Tokiwa
4,559,858 A 12/1985 Laskowski et al.
4,560,033 A 12/1985 DeWoody et al.
4,566,512 A 1/1986 Wilson
4,573,556 A 3/1986 Andreasson
4,576,073 A 3/1986 Stinson 4,589,047 A 5/1986 Gaus et al.
4,589,860 A 5/1986 Brandenstein et al.
4,599,597 A 7/1986 Rotbart
4,599,927 A 7/1986 Eccardt et al.
4,606,251 A 8/1986 Boileau
4,615,247 A 10/1986 Berkeley
4,621,300 A 11/1986 Summerer
4,625,604 A 12/1986 Handler et al.
4,637,188 A 1/1987 Crothers
4,637,289 A 1/1987 Ramsden
4,644,832 A 2/1987 Smith
4,653,189 A 3/1987 Andreasson
4,657,428 A 4/1987 Wiley
4,661,797 A 4/1987 Schmall
4,672,500 A 6/1987 Tholome et al.
4,675,664 A 6/1987 Cloutier et al.
4,679,719 A 7/1987 Kramer
4,718,229 A 1/1988 Riley
4,722,021 A 1/1988 Hornung et al.
4,751,603 A 6/1988 Kwan
4,756,220 A 7/1988 Olsen et al.
4,757,881 A 7/1988 Jonsson et al.
4,774,866 A 10/1988 Dehari et al.
4,792,965 A 12/1988 Morgan
4,805,504 A 2/1989 Fushiya et al.
4,831,279 A 5/1989 Ingraham
4,840,135 A 6/1989 Yamauchi
4,845,476 A 7/1989 Rangeard et al.
4,864,455 A 9/1989 Shimomura et al.
4,875,398 A 10/1989 Taylor et al.
4,896,607 A 1/1990 Hall et al.
4,906,962 A 3/1990 Duimstra
4,907,679 A 3/1990 Menke
4,934,233 A 6/1990 Brundage et al.
4,936,876 A 6/1990 Reyes
4,937,554 A 6/1990 Herman
4,962,685 A 10/1990 Hagstrom
4,964,450 A 10/1990 Hughes et al.
4,965,909 A 10/1990 McCullough et al.
4,975,798 A 12/1990 Edwards et al.
5,020,406 A 6/1991 Sasaki et al.
5,025,175 A 6/1991 Dubois, III
5,042,348 A 8/1991 Brundage et al.
5,046,426 A 9/1991 Julien et al.
5,052,255 A 10/1991 Gaines
5,074,047 A 12/1991 King
5,081,406 A 1/1992 Hughes et al.
5,082,316 A 1/1992 Wardlaw
5,083,973 A 1/1992 Townsend
5,086,890 A 2/1992 Turczyn et al.
5,094,000 A 3/1992 Becht et al.
5,116,249 A 5/1992 Shiotani et al.
5,119,555 A 6/1992 Johnson
5,122,091 A 6/1992 Townsend
5,146,714 A 9/1992 Liiber
5,174,349 A 12/1992 Svetlik et al.
5,184,534 A 2/1993 Lee
5,198,702 A 3/1993 McCullough et al.
5,199,343 A 4/1993 OBanion
5,201,110 A 4/1993 Bane
5,201,684 A 4/1993 DeBois, III
5,206,625 A 4/1993 Davis
5,207,253 A 5/1993 Hoshino et al.
5,212,621 A 5/1993 Panter
5,218,189 A 6/1993 Hutchison
5,231,359 A 7/1993 Masuda et al.
5,231,906 A 8/1993 Kogej
5,239,978 A 8/1993 Plangetis
5,245,879 A 9/1993 McKeon
5,257,570 A 11/1993 Shiotani et al.
5,265,510 A 11/1993 Hoyer-Ellefsen
5,272,946 A 12/1993 McCullough et al.
5,276,431 A 1/1994 Piccoli et al.
5,285,708 A 2/1994 Bosten et al.
5,293,802 A 3/1994 Shiotani et al.
5,320,382 A 6/1994 Goldstein et al.
5,321,230 A 6/1994 Shanklin et al.
5,331,875 A 7/1994 Mayfield
5,353,670 A * 10/1994 Metzger, Jr. ............... 83/471.3
5,377,554 A 1/1995 Reulein et al.
5,377,571 A 1/1995 Josephs
5,392,568 A 2/1995 Howard, Jr. et al.
5,392,678 A 2/1995 Sasaki et al.
5,401,928 A 3/1995 Kelley
5,411,221 A 5/1995 Collins et al.
5,423,232 A 6/1995 Miller et al.
5,436,613 A 7/1995 Ghosh et al.
5,447,085 A 9/1995 Gochnauer
5,451,750 A 9/1995 An
5,453,903 A 9/1995 Chow
5,471,888 A 12/1995 McCormick
5,480,009 A 1/1996 Wieland et al.
5,503,059 A 4/1996 Pacholok
5,510,587 A 4/1996 Reiter
5,510,685 A 4/1996 Grasselli
5,513,548 A 5/1996 Garuglieri
5,531,147 A 7/1996 Serban
5,534,836 A 7/1996 Schenkel et al.
5,572,916 A 11/1996 Takano
5,587,618 A 12/1996 Hathaway
5,592,353 A 1/1997 Shinohara et al.
5,606,889 A 3/1997 Bielinski et al.
5,619,896 A 4/1997 Chen
5,623,860 A * 4/1997 Schoene et al. ........... 83/471.3
5,647,258 A 7/1997 Brazell et al.
5,648,644 A 7/1997 Nagel
5,659,454 A 8/1997 Vermesse
5,667,152 A 9/1997 Mooring
5,671,633 A 9/1997 Wagner
5,695,306 A 12/1997 Nygren, Jr.
5,700,165 A 12/1997 Harris et al.
5,720,213 A 2/1998 Sberveglieri
5,722,308 A 3/1998 Ceroll et al.
5,724,875 A 3/1998 Meredith et al.
5,730,165 A 3/1998 Philipp
5,741,048 A 4/1998 Eccleston
5,755,148 A 5/1998 Stumpf et al.
5,771,742 A 6/1998 Bokaie et al.
5,782,001 A 7/1998 Gray
5,787,779 A 8/1998 Garuglieri
5,791,057 A 8/1998 Nakamura et al.
5,791,223 A 8/1998 Lanzer
5,791,224 A 8/1998 Suzuki et al.
5,791,441 A 8/1998 Matos et al.
5,797,307 A 8/1998 Horton
5,819,619 A 10/1998 Miller et al.
5,819,625 A 10/1998 Sberveglieri
5,852,951 A 12/1998 Santi
5,857,507 A 1/1999 Puzio et al.
5,861,809 A 1/1999 Eckstein et al.
5,875,698 A 3/1999 Ceroll et al.
5,880,954 A 3/1999 Thomson et al.
5,921,367 A 7/1999 Kashioka et al.
5,927,857 A 7/1999 Ceroll et al.
5,930,096 A 7/1999 Kim
5,937,720 A 8/1999 Itzov
5,942,975 A 8/1999 Sorensen
5,943,932 A 8/1999 Sberveglieri
5,950,514 A 9/1999 Benedict et al.
5,963,173 A 10/1999 Lian et al.
5,974,927 A 11/1999 Tsune
5,989,116 A 11/1999 Johnson et al.
6,009,782 A 1/2000 Tajima et al.
6,018,284 A 1/2000 Rival et al.
6,037,729 A 3/2000 Woods et al.
6,052,884 A 4/2000 Steckler et al.

| | | | | |
|---|---|---|---|---|
| 6,062,121 | A | 5/2000 | Ceroll et al. | |
| 6,070,484 | A | 6/2000 | Sakamaki | |
| 6,095,092 | A | 8/2000 | Chou | |
| 6,112,785 | A | 9/2000 | Yu | |
| 6,119,984 | A | 9/2000 | Devine | |
| 6,133,818 | A | 10/2000 | Hsieh et al. | |
| 6,141,192 | A | 10/2000 | Garzon | |
| 6,148,504 | A | 11/2000 | Schmidt et al. | |
| 6,148,703 | A | 11/2000 | Ceroll et al. | |
| 6,150,826 | A | 11/2000 | Hokodate et al. | |
| 6,161,459 | A | 12/2000 | Ceroll et al. | |
| 6,170,370 | B1 | 1/2001 | Sommerville | |
| 6,244,149 | B1 | 6/2001 | Ceroll et al. | |
| 6,250,190 | B1 | 6/2001 | Ceroll et al. | |
| 6,257,061 | B1 | 7/2001 | Nonoyama et al. | |
| 6,283,002 | B1 | 9/2001 | Chiang | |
| 6,295,910 | B1 | 10/2001 | Childs et al. | |
| 6,325,195 | B1 | 12/2001 | Doherty | |
| 6,330,848 | B1 | 12/2001 | Nishio et al. | |
| 6,336,273 | B1 * | 1/2002 | Nilsson et al. | 30/389 |
| 6,352,137 | B1 | 3/2002 | Stegall et al. | |
| 6,357,328 | B1 | 3/2002 | Ceroll et al. | |
| 6,366,099 | B1 | 4/2002 | Reddi | |
| 6,376,939 | B1 | 4/2002 | Suzuki et al. | |
| 6,404,098 | B1 | 6/2002 | Kayama et al. | |
| 6,405,624 | B2 | 6/2002 | Sutton | |
| 6,418,829 | B1 | 7/2002 | Pilchowski | |
| 6,420,814 | B1 | 7/2002 | Bobbio | |
| 6,427,570 | B1 | 8/2002 | Miller et al. | |
| 6,430,007 | B1 | 8/2002 | Jabbari | |
| 6,431,425 | B1 | 8/2002 | Moorman et al. | |
| 6,450,077 | B1 | 9/2002 | Ceroll et al. | |
| 6,453,786 | B1 | 9/2002 | Ceroll et al. | |
| 6,460,442 | B2 | 10/2002 | Talesky et al. | |
| 6,471,106 | B1 | 10/2002 | Reining | |
| 6,479,958 | B1 | 11/2002 | Thompson et al. | |
| 6,484,614 | B1 | 11/2002 | Huang | |
| D466,913 | S | 12/2002 | Ceroll et al. | |
| 6,492,802 | B1 | 12/2002 | Bielski | |
| D469,354 | S | 1/2003 | Curtsinger | |
| 6,502,493 | B1 | 1/2003 | Eccardt et al. | |
| 6,536,536 | B1 | 3/2003 | Gass et al. | |
| 6,543,324 | B2 | 4/2003 | Dils | |
| 6,546,835 | B2 | 4/2003 | Wang | |
| 6,564,909 | B1 | 5/2003 | Razzano | |
| 6,575,067 | B2 | 6/2003 | Parks et al. | |
| 6,578,460 | B2 | 6/2003 | Sartori | |
| 6,578,856 | B2 | 6/2003 | Kahle | |
| 6,581,655 | B2 | 6/2003 | Huang | |
| 6,595,096 | B2 | 7/2003 | Ceroll et al. | |
| D478,917 | S | 8/2003 | Ceroll et al. | |
| 6,601,493 | B1 | 8/2003 | Crofutt | |
| 6,607,015 | B1 | 8/2003 | Chen | |
| D479,538 | S | 9/2003 | Welsh et al. | |
| 6,617,720 | B1 | 9/2003 | Egan, III et al. | |
| 6,619,348 | B2 | 9/2003 | Wang | |
| 6,640,683 | B2 | 11/2003 | Lee | |
| 6,644,157 | B2 | 11/2003 | Huang | |
| 6,647,847 | B2 | 11/2003 | Hewitt et al. | |
| 6,659,233 | B2 | 12/2003 | DeVlieg | |
| 6,684,750 | B2 | 2/2004 | Yu | |
| 6,722,242 | B2 | 4/2004 | Chuang | |
| 6,734,581 | B1 | 5/2004 | Griffis | |
| 6,736,042 | B2 | 5/2004 | Behne et al. | |
| 6,742,430 | B2 * | 6/2004 | Chen | 83/520 |
| 6,796,208 | B1 | 9/2004 | Jorgensen | |
| 6,800,819 | B2 | 10/2004 | Sato et al. | |
| 6,826,988 | B2 | 12/2004 | Gass et al. | |
| 6,826,992 | B1 | 12/2004 | Huang | |
| 6,840,144 | B2 | 1/2005 | Huang | |
| 6,854,371 | B2 | 2/2005 | Yu | |
| 6,857,345 | B2 | 2/2005 | Gass et al. | |
| 6,874,397 | B2 * | 4/2005 | Chang | 83/471.3 |
| 6,874,399 | B2 * | 4/2005 | Lee | 83/581 |
| 6,880,440 | B2 | 4/2005 | Gass et al. | |
| 6,889,585 | B1 | 5/2005 | Harris et al. | |
| 6,920,814 | B2 | 7/2005 | Gass et al. | |
| 6,922,153 | B2 | 7/2005 | Pierga et al. | |
| 6,945,148 | B2 | 9/2005 | Gass et al. | |
| 6,945,149 | B2 | 9/2005 | Gass et al. | |
| 6,957,601 | B2 | 10/2005 | Gass et al. | |
| 6,968,767 | B2 | 11/2005 | Yu | |
| 6,986,370 | B1 | 1/2006 | Schoene et al. | |
| 6,994,004 | B2 | 2/2006 | Gass et al. | |
| 6,997,090 | B2 | 2/2006 | Gass et al. | |
| 7,000,514 | B2 | 2/2006 | Gass et al. | |
| 7,024,975 | B2 | 4/2006 | Gass et al. | |
| 2001/0032534 | A1 | 10/2001 | Cerroll et al. | |
| 2002/0017175 | A1 | 2/2002 | Gass et al. | |
| 2002/0017176 | A1 | 2/2002 | Gass et al. | |
| 2002/0017178 | A1 | 2/2002 | Gass et al. | |
| 2002/0017179 | A1 | 2/2002 | Gass et al. | |
| 2002/0017180 | A1 | 2/2002 | Gass et al. | |
| 2002/0017181 | A1 | 2/2002 | Gass et al. | |
| 2002/0017182 | A1 | 2/2002 | Gass et al. | |
| 2002/0017183 | A1 | 2/2002 | Gass et al. | |
| 2002/0017184 | A1 | 2/2002 | Gass et al. | |
| 2002/0017336 | A1 | 2/2002 | Gass et al. | |
| 2002/0020261 | A1 | 2/2002 | Gass et al. | |
| 2002/0020262 | A1 | 2/2002 | Gass et al. | |
| 2002/0020263 | A1 | 2/2002 | Gass et al. | |
| 2002/0020265 | A1 | 2/2002 | Gass et al. | |
| 2002/0020271 | A1 | 2/2002 | Gass et al. | |
| 2002/0043776 | A1 | 4/2002 | Chuang | |
| 2002/0050201 | A1 | 5/2002 | Lane et al. | |
| 2002/0056348 | A1 | 5/2002 | Gass et al. | |
| 2002/0056349 | A1 | 5/2002 | Gass et al. | |
| 2002/0056350 | A1 | 5/2002 | Gass et al. | |
| 2002/0059853 | A1 | 5/2002 | Gass et al. | |
| 2002/0059854 | A1 | 5/2002 | Gass et al. | |
| 2002/0059855 | A1 | 5/2002 | Gass et al. | |
| 2002/0066346 | A1 | 6/2002 | Gass et al. | |
| 2002/0069734 | A1 | 6/2002 | Gass et al. | |
| 2002/0096030 | A1 | 7/2002 | Wang | |
| 2002/0109036 | A1 | 8/2002 | Denen et al. | |
| 2002/0170399 | A1 | 11/2002 | Gass et al. | |
| 2002/0170400 | A1 | 11/2002 | Gass | |
| 2002/0190581 | A1 | 12/2002 | Gass et al. | |
| 2003/0000359 | A1 | 1/2003 | Eccardt et al. | |
| 2003/0002942 | A1 | 1/2003 | Gass et al. | |
| 2003/0005588 | A1 | 1/2003 | Gass et al. | |
| 2003/0015253 | A1 | 1/2003 | Gass et al. | |
| 2003/0019341 | A1 | 1/2003 | Gass et al. | |
| 2003/0020336 | A1 | 1/2003 | Gass et al. | |
| 2003/0037651 | A1 | 2/2003 | Gass et al. | |
| 2003/0037655 | A1 * | 2/2003 | Chin-Chin | 83/397 |
| 2003/0056853 | A1 | 3/2003 | Gass et al. | |
| 2003/0058121 | A1 | 3/2003 | Gass et al. | |
| 2003/0074873 | A1 | 4/2003 | Freiberg et al. | |
| 2003/0089212 | A1 | 5/2003 | Parks et al. | |
| 2003/0090224 | A1 | 5/2003 | Gass et al. | |
| 2003/0101857 | A1 | 6/2003 | Chuang | |
| 2003/0109798 | A1 | 6/2003 | Kermani | |
| 2003/0131703 | A1 | 7/2003 | Gass et al. | |
| 2003/0140749 | A1 | 7/2003 | Gass et al. | |
| 2004/0011177 | A1 | 1/2004 | Huang | |
| 2004/0040426 | A1 | 3/2004 | Gass et al. | |
| 2004/0060404 | A1 * | 4/2004 | Metzger | 83/58 |
| 2004/0104085 | A1 | 6/2004 | Lang et al. | |
| 2004/0159198 | A1 * | 8/2004 | Peot et al. | 83/62.1 |
| 2004/0194594 | A1 * | 10/2004 | Dils et al. | 83/13 |
| 2004/0200329 | A1 * | 10/2004 | Sako | 83/58 |
| 2004/0226424 | A1 * | 11/2004 | O'Banion et al. | 83/397 |
| 2004/0226800 | A1 | 11/2004 | Pierga et al. | |
| 2004/0255745 | A1 | 12/2004 | Peot et al. | |
| 2005/0057206 | A1 | 3/2005 | Uneyama | |

| | | | |
|---|---|---|---|
| 2005/0092149 A1* | 5/2005 | Hartmann | 83/58 |
| 2005/0139051 A1 | 6/2005 | Gass et al. | |
| 2005/0139056 A1 | 6/2005 | Gass et al. | |
| 2005/0139057 A1 | 6/2005 | Gass et al. | |
| 2005/0139058 A1 | 6/2005 | Gass et al. | |
| 2005/0139459 A1 | 6/2005 | Gass et al. | |
| 2005/0155473 A1 | 7/2005 | Gass | |
| 2005/0166736 A1 | 8/2005 | Gass et al. | |
| 2005/0178259 A1 | 8/2005 | Gass et al. | |
| 2005/0211034 A1 | 9/2005 | Sasaki et al. | |
| 2005/0235793 A1 | 10/2005 | O'Banion et al. | |
| 2005/0274432 A1 | 12/2005 | Gass et al. | |
| 2006/0000337 A1 | 1/2006 | Gass | |
| 2006/0032352 A1 | 2/2006 | Gass et al. | |
| 2006/0123960 A1 | 6/2006 | Gass et al. | |
| 2006/0123964 A1 | 6/2006 | Gass et al. | |

FOREIGN PATENT DOCUMENTS

| | | |
|---|---|---|
| CH | 297525 | 6/1954 |
| DE | 76186 | 8/1921 |
| DE | 2800403 | 7/1979 |
| DE | 2917497 A * | 11/1980 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Skil Model 3400-Type 1 10" Table Saw Parts List and Technical Bulletin, S-B Power Tool Company, Jun. 1993.

Shop Fox® Fence Operating Manual, Woodstock International, Inc., 1996, revised May 1997.

Excaliber T-Slot Precision Saw Fence Model TT45 Owner's Manual, Sommerville Design & Manufacturing, Inc., May 2000.

Bosch Model 4000 Worksite Table Saw Operating/Safety Instructions, S-B Power Tool Company, Jul. 2000.

XACTA Fence II™ Homeshop 30/52 Owner's Manual, JET Equipment & Tools, Mar. 2001.

XACTA Fence II™ Commercial 30/50 Owner's Manual, JET Equipment & Tools, Mar. 2001.

Bosch 10" Table Saw Model 0601476139 Parts List and Technical Bulletin, S-B Power Tool Company, Apr. 2001.

Biesemeyer® T-Square® Universal Home Shop Fence system Instruction Manual, Delta Machinery, Jun. 1, 2001.

Powermatic 10" Tilting Arbor Saw Model 66 Instruction Manual & Parts List, JET Equipment & Tools, Jun. 2001.

Skil Model 3400 Table Saw Operating/Safety Instructions, S-B Power Tool Company, Sep. 2001.

The Merlin Splitter by Excalibur a Sommerville Design Product Overview & Generic Installation Notes, Sommerville Design & Manufacturing Inc., at least as early as 2002.

INCRA Incremental Micro Precision Table Saw Fence Owner's Manual, Taylor Design Group, Inc., 2003.

Shop Fox® Models W2005, W2006, W2007 Classic Fence Instruction Manual, Woodstock International, Jan. 2000, revised Mar. 2004.

Accu-Fence® 64A Fence and Rail System Owner's Manual, WMH Tool Group, Sep. 2004.

Unifence™ Saw Guide Instruction Manual, Delta Machinery, Feb. 22, 2005.

Biesemeyer® T-Square® Commercial Fence System Instruction Manual, Delta Machinery, May 2, 2005.

Laguna Tools table saw owner's manual, date unknown.

Tablesaw Splitters and Blade Covers, *Fine Woodworking*, pp. 77-81, Dec. 2001.

Young Inventor: Teen's Device Earns Her Trip to Science Fair, *The Arizona Republic*, May 5, 2006.

Operator Injury Mitigation Using Electronic Sensing and Mechanical Braking and Decoupling Devices in Handheld Circular Saws, Erin F. Eppard, date unknown.

* cited by examiner

MITER SAW WITH IMPROVED SAFETY SYSTEM

CROSS-REFERENCE TO RELATED APPLICATIONS

This application is a continuation of U.S. patent application Ser. Nos. 10/047,066 and 10/050,085, both filed Jan. 14, 2002 now abandoned.

FIELD

The present invention relates to miter saws, and more particularly to miter saws with high-speed safety systems.

BACKGROUND

Miter saws are a type of woodworking machinery used to cut workpieces of wood, plastic and other materials. Miter saws typically include a base upon which workpieces are placed and include a circular saw blade mounted on a pivot arm. A person uses a miter saw by placing a workpiece on the base beneath the upraised blade and then bringing the blade down via the pivot arm to cut the workpiece. Miter saws present a risk of injury to users because the spinning blade is often exposed when in use. Furthermore, users often use their hands to position and support workpieces beneath the blade, which increases the chance that an injury will occur.

The present invention provide miter saws with improved safety systems that are adapted to detect the occurrence of one or more dangerous, or triggering, conditions during use of the miter saw, such as when a user's body contacts the spinning saw blade. When such a condition occurs, a safety system is actuated to limit or even prevent injury to the user.

DETAILED DESCRIPTION

Figure 1:
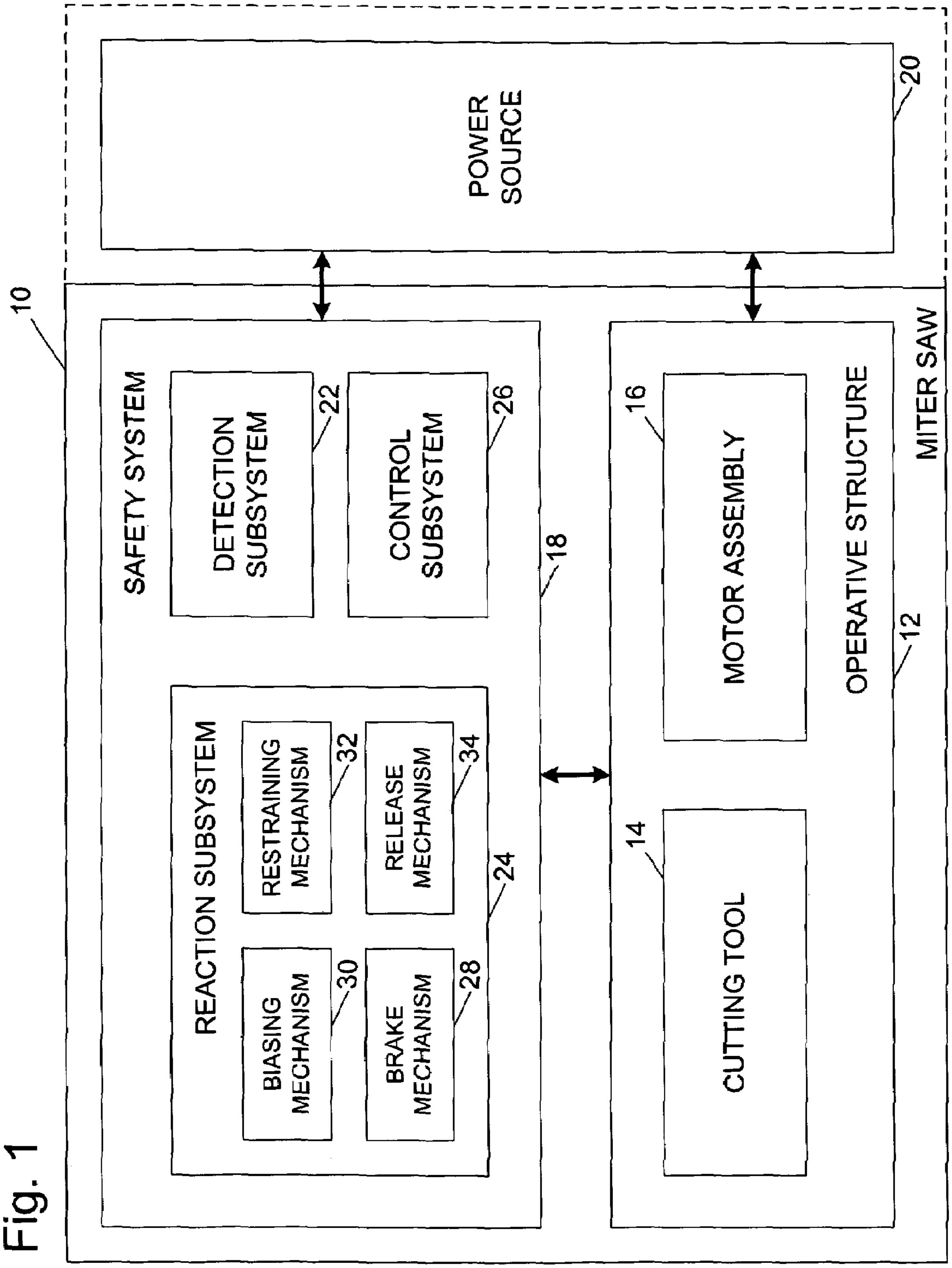
FIG. 1 is a schematic block diagram of a miter saw with a fast-acting safety system according to the present invention.

A miter saw according to the present invention is shown schematically in FIG. 1 and indicated generally at 10. Miter saw 10 may be any of a variety of different types and configurations of miter saw adapted for cutting workpieces, such as wood, plastic, etc. Miter saw 10 includes an operative structure 12 having a cutting tool 14 and a motor assembly 16 adapted to drive the cutting tool. Miter saw 10 also includes a safety system 18 configured to minimize the potential of a serious injury to a person using miter saw 10. Safety system 18 is adapted to detect the occurrence of one or more dangerous, or triggering, conditions during use of miter saw 10. If such a dangerous condition is detected, safety system 18 is adapted to engage operative structure 12 to limit any injury to the user caused by the dangerous condition.

Miter saw 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of miter saw 10.

It will be appreciated that operative structure 12 may take any one of many different forms, depending on the type of miter saw 10. As will be described in more detail below, operative structure 12 typically takes the form of an arm pivotally coupled to a base. Cutting tool 14 is mounted on the arm and pivotal toward a workpiece supported by the base. Alternatively, the arm may be both pivotally and slidably coupled to the base.

Motor assembly 16 includes one or more motors adapted to drive cutting tool 14. The motors may be either directly or indirectly coupled to the cutting tool. Typically, motor assembly 16 is mounted on the pivot arm and directly coupled to the cutting tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of miter saw 10. In addition, control subsystem 26 typically includes one or more instruments operable by a user to control the miter saw. The control subsystem is configured to control miter saw 10 in response to the inputs it receives.

Detection subsystem 22 is configured to detect one or more dangerous, or triggering, conditions during use of miter saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676, 190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of miter saw 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of miter saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
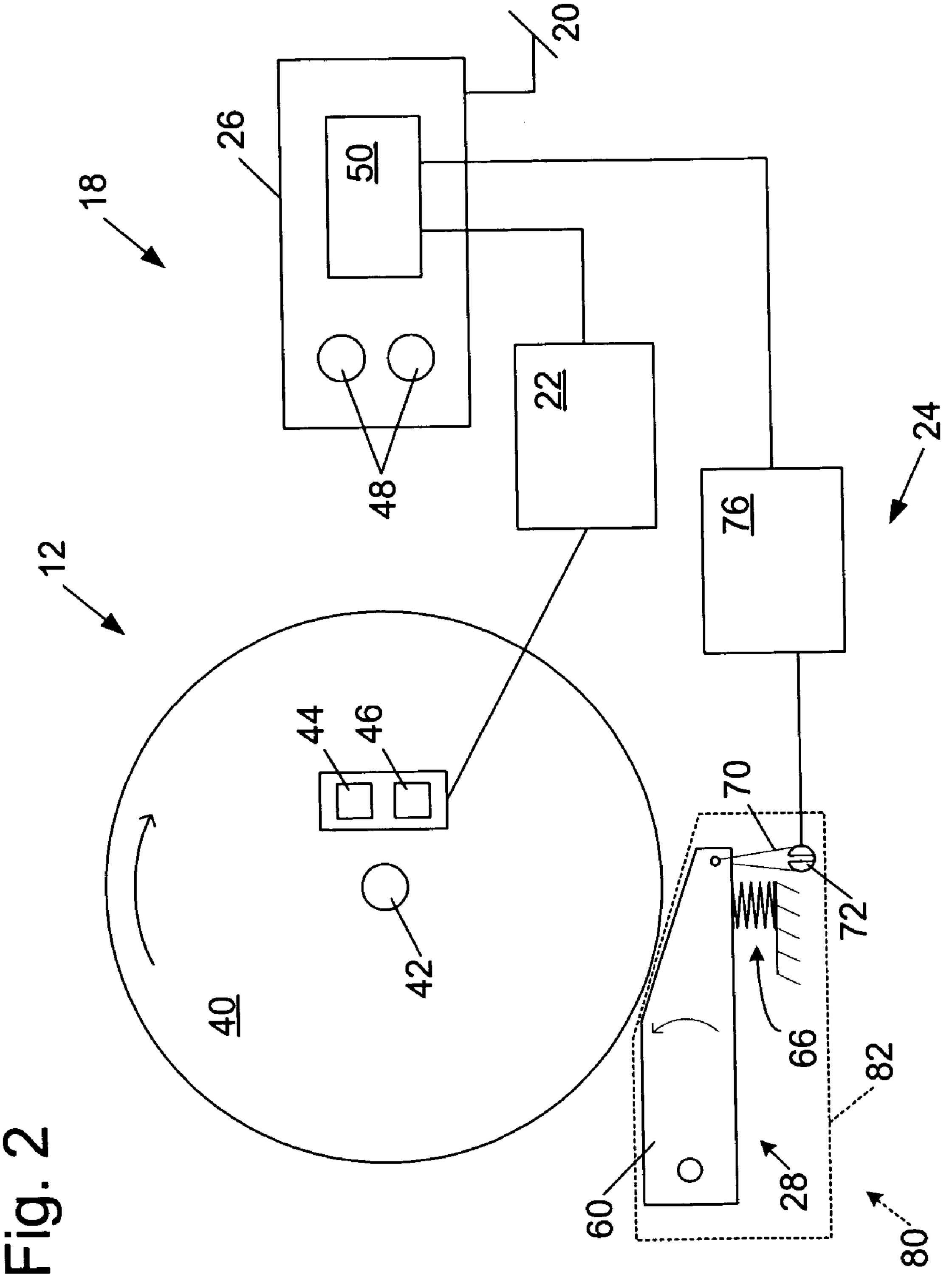
FIG. 2 is a schematic diagram of an exemplary safety system configured to stop the miter saw blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of miter saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, brake mechanism 28 is adapted to engage the teeth of blade 40 and stop rotation of the blade.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of miter saw 10. Alternatively, detection subsystem 22 may include a different sensor assembly configured to detect contact in other ways, such as optically resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000, U.S. patent application Ser. No. 09/929,221, filed Aug. 13, 2001 and U.S. Provisional Patent Application Ser. No. 60/270,011, filed Feb. 20, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW), Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism such as a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000 and U.S. patent application Ser. No. 09/929,241, filed Aug. 13, 2001, the disclosures of which are herein incorporated by reference.

It will be appreciated that activation of the brake mechanism may require the replacement of one or more portions of safety system 18. For example, pawl 60 and fusible member 70 typically are single-use components which must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000 and U.S. patent application Ser. No. 09/929,244, filed Aug. 13, 2001, the disclosures of which are herein incorporated by reference.

In the exemplary embodiment illustrated in FIG. 2, reaction subsystem 24 is configured to act on cutting tool 14 and stop rotation of blade 40. As mentioned above, reaction subsystem 24 may be configured also to act on a different portion of operative structure 12 to stop and/or reverse the translation of blade 40 toward the workpiece and the user's body. Otherwise, the blade may continue to move toward the user's body even though the blade has stopped rotating. For example, U.S. Provisional Patent Application Ser. No. 60/270,941, filed Feb. 22, 2001, U.S. Provisional Patent Application Ser. No. 60/270,942, filed Feb. 22, 2001, U.S. Provisional Patent Application Ser. No. 60/273,178, filed Mar. 2, 2001 and U.S. Provisional Patent Application Ser. No. 60/273,902, filed Mar. 6, 2001, the disclosures of which are herein incorporated by reference, describe various alternative embodiments of reaction subsystem 24 configured to stop any downward movement of the miter saw blade and/or move the blade upward away from the workpiece and the user's body.

Figure 3:
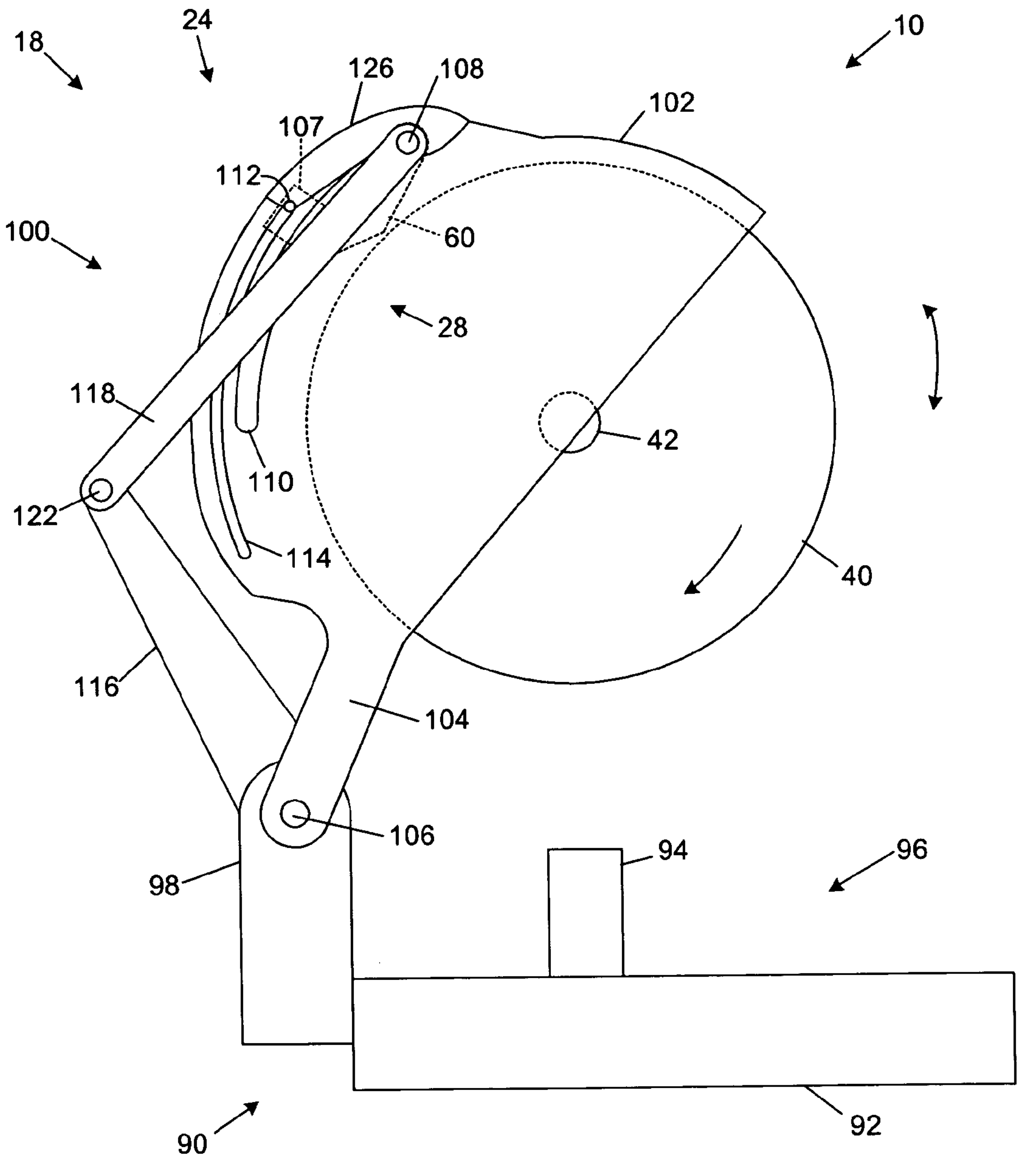
FIG. 3 is a schematic side elevation of an exemplary miter saw having a safety system configured to stop both the rotation and downward movement of the blade.
Figure 4:
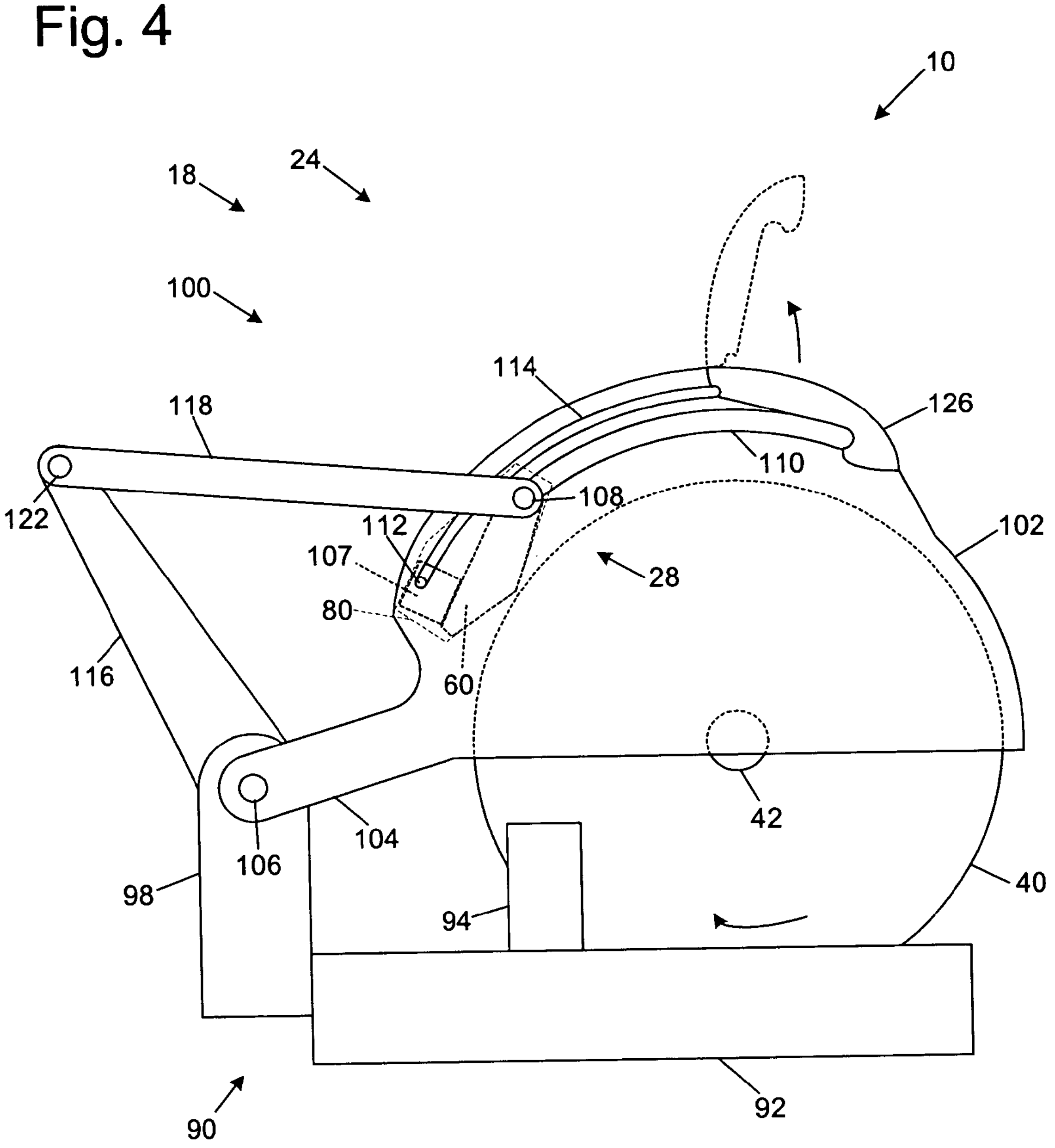
FIG. 4 is similar to FIG. 3 but shows the pivot arm assembly pivoted downward into the cutting zone.
Figure 5:
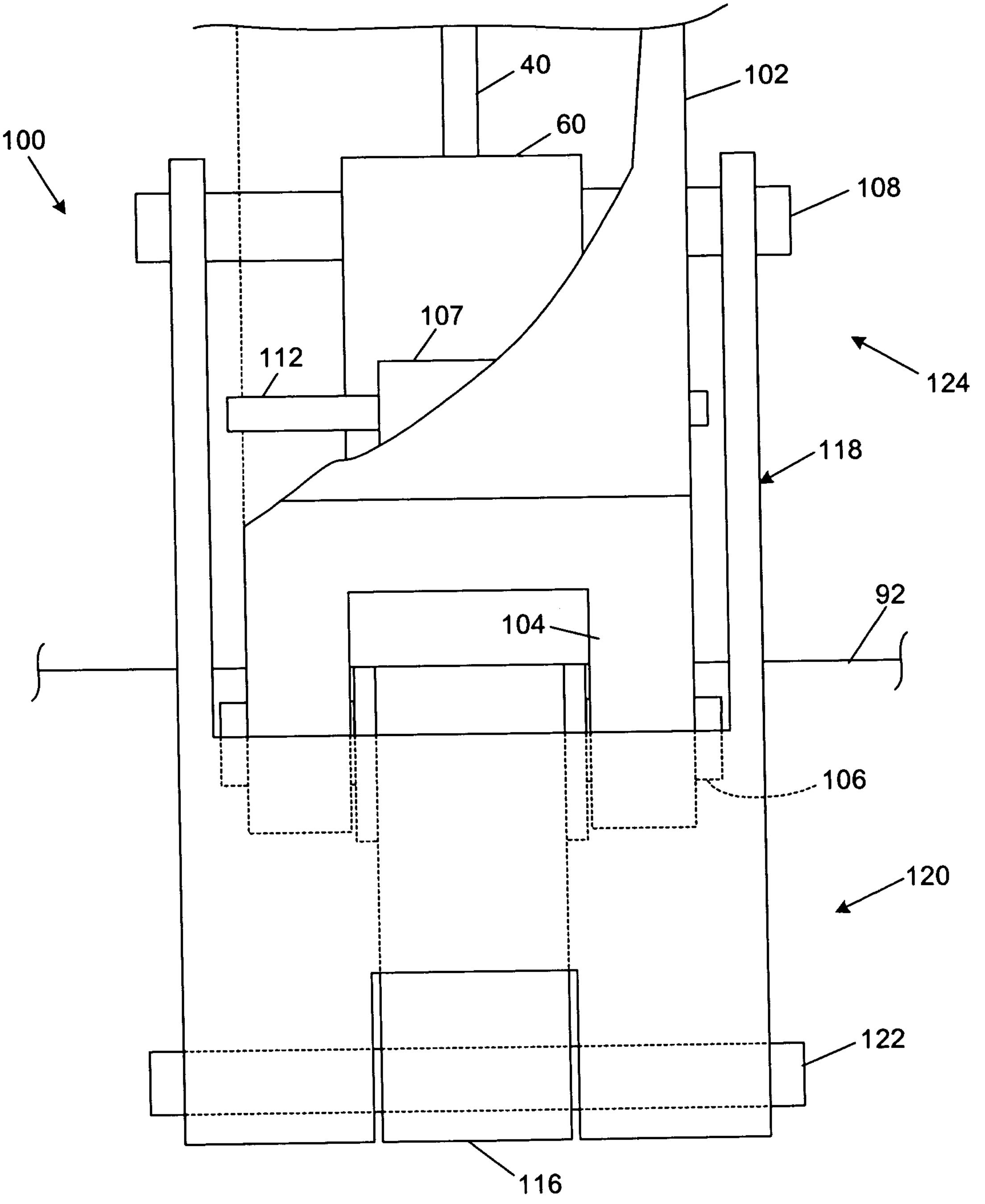
FIG. 5 is a partial top plan view of the miter saw of FIG. 3, with a portion of the housing cut away to show the brake pawl.

Turning attention now to FIGS. 3-5, another alternative embodiment is illustrated in which reaction subsystem 24 is configured to stop both the rotation and downward movement of the blade. Exemplary miter saw 10 includes a base assembly 90 having a base 92 adapted to support a workpiece during cutting. Typically, one or more fences 94 are mounted on base 92 and adapted to prevent workpieces from shifting across the base during cutting. Base 92 and fences 94 define a cutting zone 96 in which workpieces may be cut. Exemplary base assembly 90 also includes a tilt mechanism 98 coupled to base 92.

As in the embodiments described above, blade 40 is mounted on a rotatable arbor 42. The arbor is driven by a motor assembly (not shown) which is supported above base 92 by a pivot arm assembly 100. As shown in FIGS. 3 and 4, the pivot arm assembly is selectively pivotal toward and away from cutting zone 96 to cut workpieces with the blade. In addition, at least a portion of tilt mechanism 98 is selectively tiltable relative to base 92 to make beveled cuts in the workpiece.

Pivot arm assembly 100 includes a housing 102 extending outward from one end of an arm 104. The opposite end of arm 104 is connected to tilt mechanism 98 by a pivot coupling 106. Housing 102 is configured to extend at least partially around an upper portion of blade 40. Typically, pivot arm assembly 100 includes a spring or other biasing mechanism (not shown) adapted to maintain the housing and blade in a fully upward position away from cutting zone 96 when the miter saw is not in use.

Reaction subsystem 24 includes a brake mechanism 28 having at least one brake pawl 60 engageable by an actuator 107. The actuator typically includes a restraining mechanism adapted to hold the brake pawl away from the blade against the urging of a biasing mechanism. In response to an activation signal, a release mechanism within the actuator releases the brake pawl from the restraining mechanism to pivot into the blade, usually stopping the blade within approximately 2-5 milliseconds. Optionally, brake pawl 60 and/or one or more components of actuator 106 may be contained in a replaceable cartridge, such as indicated at 80 in FIG. 4. Exemplary actuators, restraining mechanisms, biasing mechanisms, release mechanisms, cartridges and brake pawls are described in more detail above and in the incorporated references.

Brake pawl 60 is mounted on a movable pivot pin 108 configured to slide within a first set of channels 110 in either side of housing 102. First set of channels 110 define concentric arcs about arbor 42. As a result, pivot pin 108 is maintained at a constant radius from the arbor as it slides within the first set of channels. A positioning pin 112 extends from one or both sides of actuator 106 to slide within a second set of channels 114. The second set of channels also define concentric arcs about arbor 42 so that positioning pin 112 maintains a constant radius from the arbor as it slides within the second set of channels. Since brake pawl 60 is coupled to actuator 112, both the brake pawl and actuator are maintained in a constant orientation relative to the arbor and the perimeter of the blade as pivot pin 108 slides within first set of channels 110.

As shown in FIG. 5, brake pawl 60 is laterally positioned on pivot pin 108 so that a central portion of the brake pawl is aligned with the blade. Brake mechanism 28 may include suitable positioning structure to maintain the brake pawl aligned with the blade. For example, annular spacers may be placed on pivot pin 108 on either side of the brake pawl to butt against the inner sides of housing 102. Alternatively, the brake pawl may be constructed to have a width substantially equal to the inner width of the housing. In alternative embodiments where cartridge 80 is used, the cartridge may be sized to extend substantially from one inner side of the housing to the other. As a further alternative, the inner sides of the housing may include projections which extend inward to center the cartridge or brake pawl relative to the blade.

Base assembly 90 also includes a brace member 116 extending upward from tilt mechanism 98. In the exemplary embodiment, brace member 116 extends upward from the tilt mechanism at an angle away from pivot arm assembly 100 so that the pivot arm assembly is not obstructed from pivoting to a fully raised position, as illustrated in FIG. 3. It will be appreciated that brace member 116 and tilt mechanism 98 may be formed as an integral, unitary structure. Alternatively, the brace member and tilt mechanism may be formed separately and then coupled together. In any event, the brace member is coupled to the tilt mechanism so as to prevent any pivoting movement of the brace member toward or away from the cutting zone. However, the brace member is configured to tilt along with the tilt mechanism relative to the base when the miter saw is adjusted for bevel cuts.

Pivot pin 108 is coupled to brace member 116 by a linkage assembly 118. As best seen in FIG. 5, one end of linkage assembly 118 includes a fork structure 120 pivotally coupled to a pivot pin 122 mounted in brace member 116. The opposite end of linkage assembly 118 includes a fork structure 124 pivotally coupled to each end of pivot pin 108. As shown, linkage assembly 118 is coupled to pivot pin 108 on either side of brake pawl 60. This provides increased stability and support when the brake pawl engages the blade. In an alternative embodiment, the linkage assembly may take the form of a pair of separate arms extending between pin 108 and pin 122 on either side of the brake pawl. As a further alternative, linkage assembly 118 may be configured to engage pivot pin 108 and/or pivot pin 122 on only a single side of the brake pawl. As another alternative embodiment, the linkage assembly may be configured to engage the center of pivot pin 108 (e.g., through a cut-out in the brake pawl) and/or the center of pivot pin 122 (e.g., through a cut-out in brace member 116).

In any event, the linkage assembly pivots relative to brace member 116 as the housing is pivoted toward and away from the cutting zone. Brace member 116 pushes or pulls pivot pin 108 and brake pawl 60 around the perimeter of the blade in first set of channels 110 as the housing is raised or lowered. Thus, the brake pawl is maintained at a constant distance from the brace member regardless of the position of the housing.

In response to an activation signal from a control subsystem (not shown), brake pawl 60 is pivoted into the teeth of blade 40. When the brake pawl engages the blade the angular momentum of the blade produces a force on the brake pawl that tends to urge the brake pawl to move in a clockwise direction along first set of channels 110. In other words, at least a portion of the angular momentum of the blade is transferred to the brake pawl. The force on brake pawl 60 is transferred to brace member 116 by linkage assembly 118. Linkage assembly 118 may be constructed of any relatively rigid material adapted to support brake pawl 60 during braking of the blade, including metal, plastic, etc.

Brace member 116 prevents the brake pawl from sliding clockwise within first set of channels 110 unless housing 102 pivots upward away from the cutting zone. As a result, pivot arm assembly 100 will be urged upward by engagement of the brake pawl with the blade. The amount of upward force on the blade will depend, at least partially, on the length of brace member 116. As the length of the brace member is increased, the upward force on the blade during braking will likewise increase. Typically, the length of the brace member is selected so that the upward force on the blade during braking is sufficient to stop any downward motion of the housing under normal operating conditions (i.e., the housing is pivoted downward toward the cutting zone at a normal speed). Optionally, the length of the brace member is selected so that the upward force on the blade during braking is sufficient to overcome and reverse any normal downward momentum of the housing and blade, thereby retracting the blade upward away from cutting zone 96.

In any event, brake pawl 60 is arranged and supported to convert at least a portion of the kinetic energy of the rotating blade into an upward force on the blade and housing. Thus, exemplary brake mechanism 28 is configured to stop both the rotation of the blade and any downward movement of the blade using a single brake pawl. As a result, only a single cartridge or brake pawl need be replaced after the brake mechanism has been triggered.

Since the upward force on the blade and housing is produced by the rapid deceleration of the blade by the brake pawl, the upward force is only temporary. Once the rotation of the blade has stopped, the housing is free to pivot toward or away from the cutting zone. Nevertheless, the blade will remain locked against further rotation until the cartridge is removed.

Housing 102 may include one or more sections 126 which may be removed or repositioned to allow installation and removal of the cartridge or brake pawl and actuator. Pivot pin 108 is typically removed by sliding it completely through the brake pawl. Positioning pin 112 may also be slid completely through the actuator and/or cartridge. Alternatively, positioning pin 112 may be dual spring-loaded pins which can be depressed to allow the cartridge to be installed and removed more easily. Optionally, housing 102 may include one or more removable covers adapted to cover one or both of the first and second set of channels during normal operation. It will be appreciated that housing 102 and the components of the brake mechanism may be configured in any of a variety of different ways to allow the brake mechanism to be easily replaced.

While one particular embodiment has been described above, many modifications and alterations are possible. For example, FIGS. 6-9 illustrate an alternative exemplary embodiment in which the brake mechanism includes a brake pawl support structure that pivots within the housing. As shown, the brake mechanism includes one or more radial support arms 128 adapted to support cartridge 80 at a constant radial distance and orientation about arbor 42. Support arms 128 are configured to pivot about the elongate central axis of arbor 42. Each arm includes an annular collar portion 130 configured to fit on and swing about one of a pair of support rings 132. One support ring 132 extends from the inner surface of housing 102, while the other support ring extends from motor assembly 16. Collar portions 130 may be retained on support rings 132 by ring clips 134 or any other suitable mechanism. It will be appreciated that support arms 128 may alternatively be coupled to pivot about the arbor in a variety of other ways such as are known to those of skill in the art.

Cartridge 80 is coupled to support arms 128 by a pivot pin 136 and a positioning pin 138. The pivot and positioning pins maintain the cartridge at a constant radial distance and orientation relative to the perimeter of the blade as support arms 128 pivot around the arbor. The support arms are coupled to a brace member 116 by one or more linkages 140. The rear end of each linkage 140 is pivotally coupled to brace member 116 by a pivot pin 142. The front end of each linkage is pivotally coupled to a different one of support arms 128 by one or more pivot pins 144. In the exemplary embodiment, pivot pins 144 are mounted in outwardly projecting shoulder regions 146 formed in each support arm 128. Shoulder regions 146 are configured to ensure pivot pins 144 and the front ends of linkages 140 remain above arbor 42 at all operable positions of pivot arm assembly 100.

In the exemplary embodiment, linkages 140 extend forward from brace member 116 through one or more holes 148 in the rear of housing 102. Therefore, housing 102 requires no arcuate channels for receiving pins 136, 138 or 144. Furthermore, linkages 140 should not interfere with standard blade guards (not shown) that typically cover the perimeter of the housing and blade. Indeed, a front section of housing 102 may optionally be constructed to telescope around the exterior of the remainder of the housing to allow a user to have greater access to the blade. Alternatively, linkages 140 may be disposed on the exterior of the housing, in which case pivot pin 136 and positioning pin 138 would extend through arcuate channels or similar openings in the housing. Although linkages 140 are depicted as separate structural elements, it will be appreciated that the linkages may be formed as an unitary member with spaced-apart arms, etc.

Figure 6:
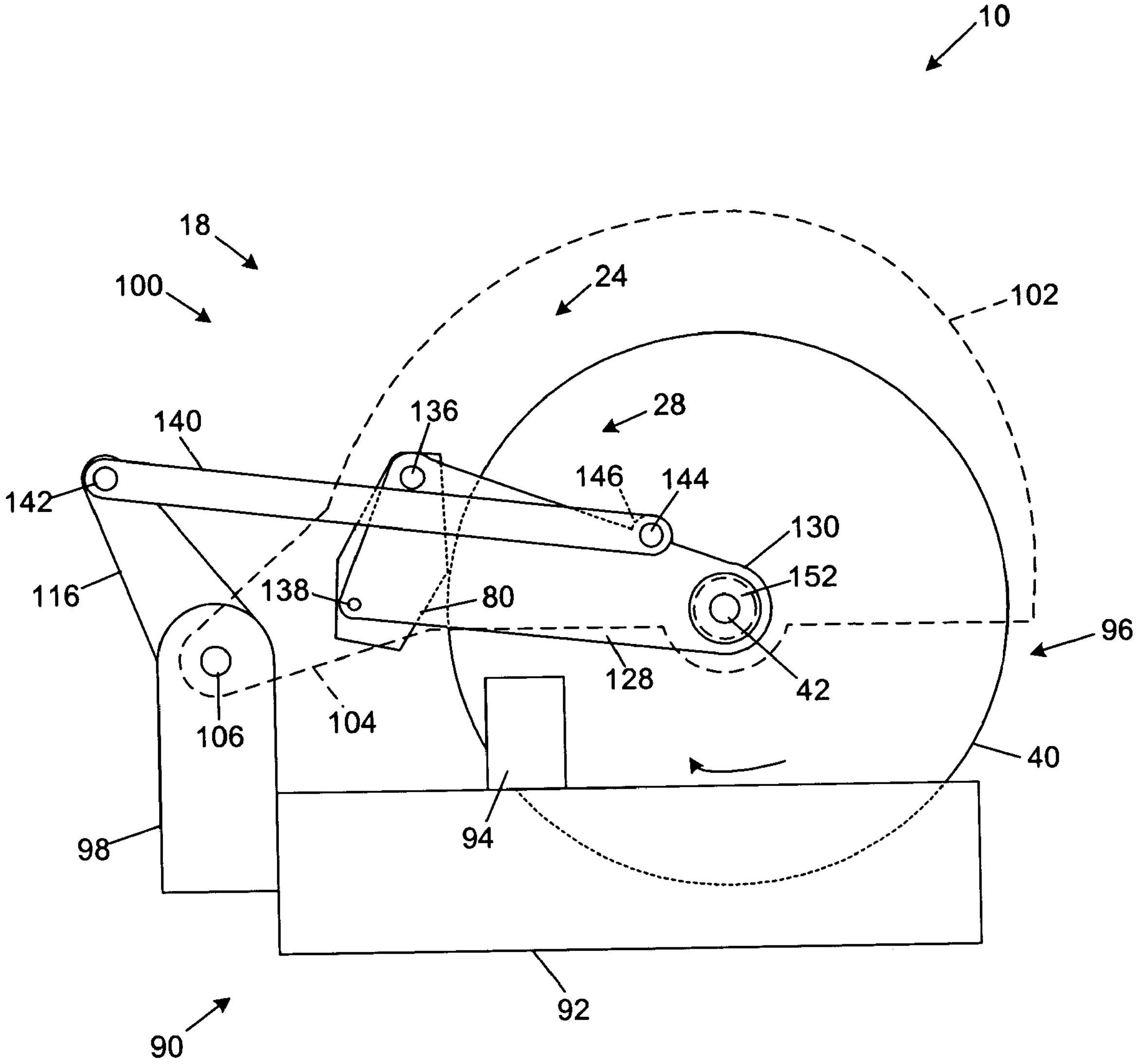
FIG. 6 is a schematic side elevation of another exemplary miter saw having an alternative safety system configured to stop both the rotation and downward movement of the blade.
Figure 7:
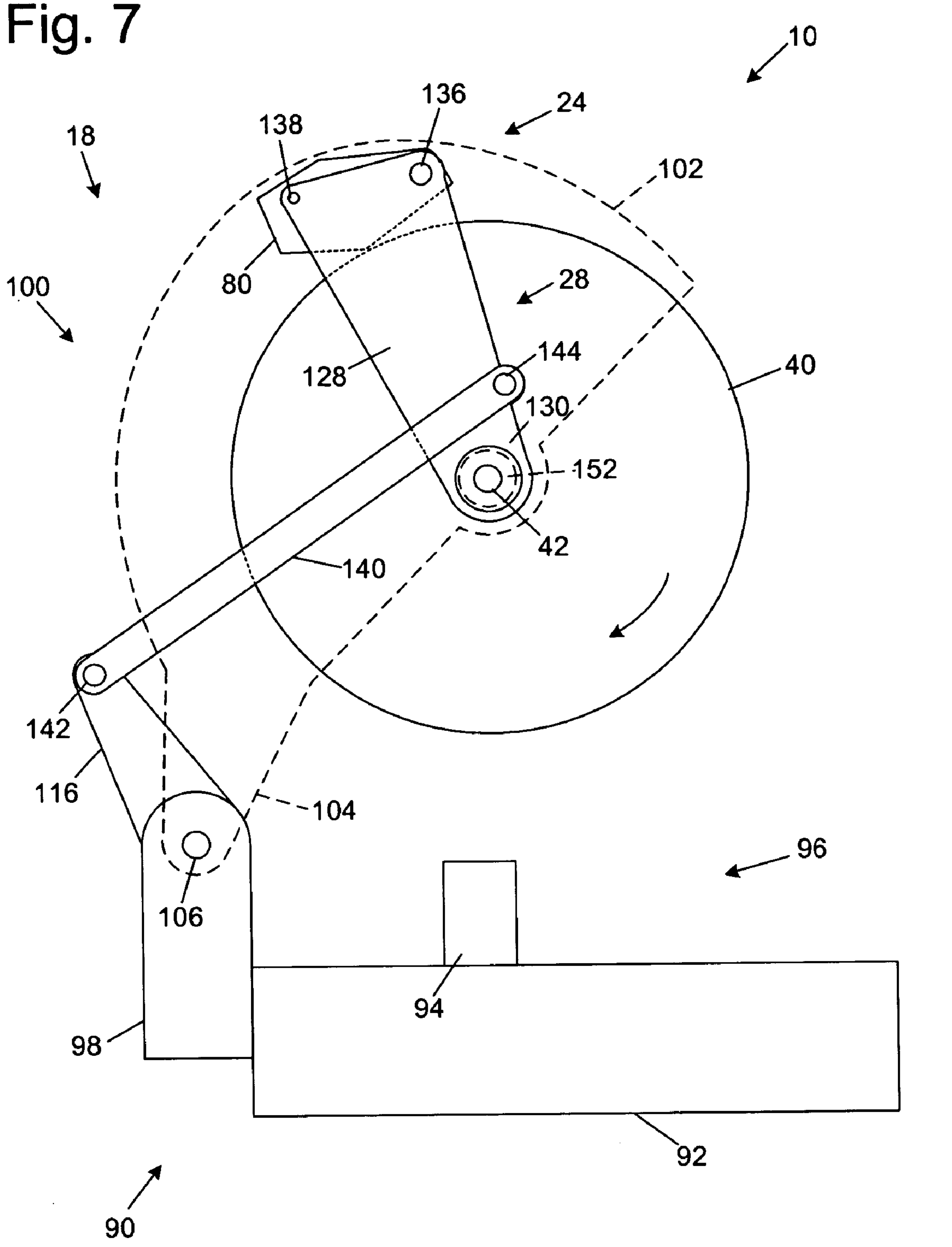
FIG. 7 is similar to FIG. 6 but shows the pivot arm assembly pivoted upward away from the cutting zone.
Figure 8:
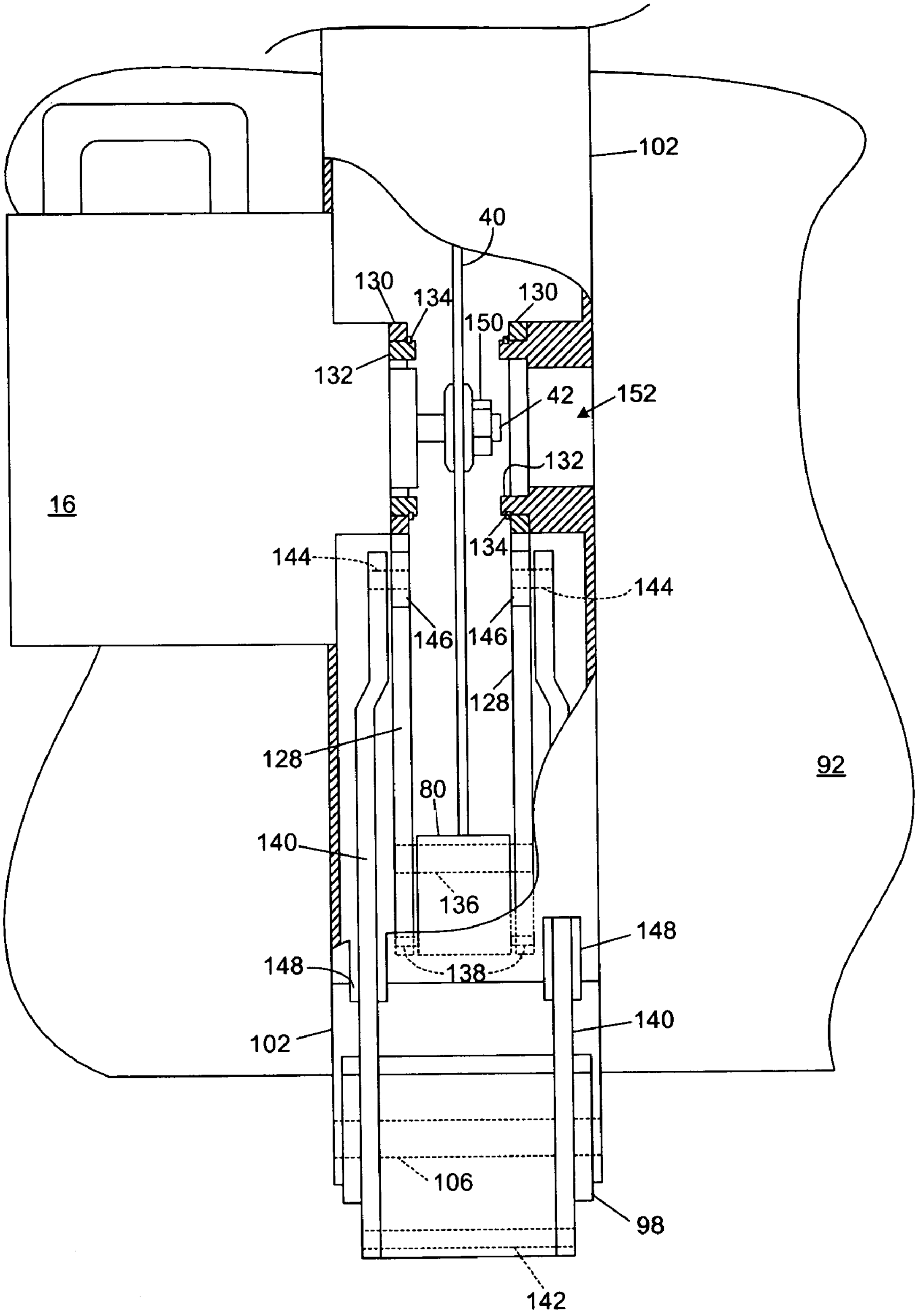
FIG. 8 is a partial top plan view of the miter saw of FIG. 6, with a portion of the housing cut away to show the brake mechanism.

Comparing FIGS. 6 and 7, it can be seen that as pivot arm assembly 100 pivots about pivot coupling 106, linkages 140 cause support arms 128 to pivot about arbor 42 in the opposite direction. Thus, cartridge 80 and brake pawl 60 are counter-pivotally coupled to the pivot arm assembly. As the pivot arm assembly and blade pivot in a clockwise direction (as seen in FIGS. 6 and 7) downward toward cutting zone 96, the cartridge and brake pawl pivot in a counter-clockwise direction about the arbor. Conversely, as the pivot arm assembly and blade pivot in a counter-clockwise direction (as seen in FIGS. 6 and 7) upward away from cutting zone 96, the cartridge and brake pawl pivot in a clockwise direction about the arbor.

The brake pawl (not shown) is mounted on pivot pin 136 to pivot into the teeth of blade 40 upon receipt of an activation signal by the cartridge. When the brake pawl engages the rotating blade, the angular momentum of the blade tends to force the brake pawl to move upward and forward in a clockwise direction (as seen in FIG. 6) about the arbor. Consequently, radial support arms 128 are urged to pivot in a clockwise direction (as seen in FIG. 6) about the arbor. Since the radial support arms are connected to brace member 116 by linkages 140, any clockwise force on the radial support arms is translated into a counter-clockwise force about pivot coupling 106 on housing 102. In other words, when the brake pawl engages the blade, the housing and blade are urged upward away from cutting zone 96.

It will be appreciated that the amount of upward force on the housing will depend on the specific arrangement of brace member 116, linkages 140 and radial support arms 128. The counter-clockwise force on support arms 128 due to any downward momentum and/or force on the pivot arm assembly will have a lesser moment than the clockwise force due to the brake pawl engaging the blade. This is because linkages 140 are coupled to the support arms at a radial position closer to the pivot point of the support arms than is the brake pawl. The ratio of the clockwise force-moment to the counter-clockwise force-moment will depend on the ratio of the distances between pivot pin 136 and arbor 42, and between pivot pins 144 and arbor 42. Additionally, the height of pivot pin 142 above pivot coupling 106, relative to the height of pivot pins 144 above arbor 42 will also effect the ratio of the upward force on the pivot arm assembly due to the brake pawl to any downward momentum and/or force on the pivot arm assembly.

Typically, the height of pivot pin 142 above pivot coupling 106, and the position of pivot pins 144 on support arms 128 are selected to ensure that, under normal operating conditions, any downward movement of the blade toward the cutting zone is stopped when the brake pawl engages the blade. Optionally, the height of pivot pin 142 above pivot coupling 106, and the position of pivot pins 144 on support arms 128 may be selected to ensure that the clockwise force-moment on the support arms is greater than the normal counter-clockwise force-moment when the brake pawl engages the blade. In such case, the blade is pushed or retracted upward and at least partially away from the cutting zone when a dangerous condition is detected such as contact between the user's body and the blade.

Figure 9:
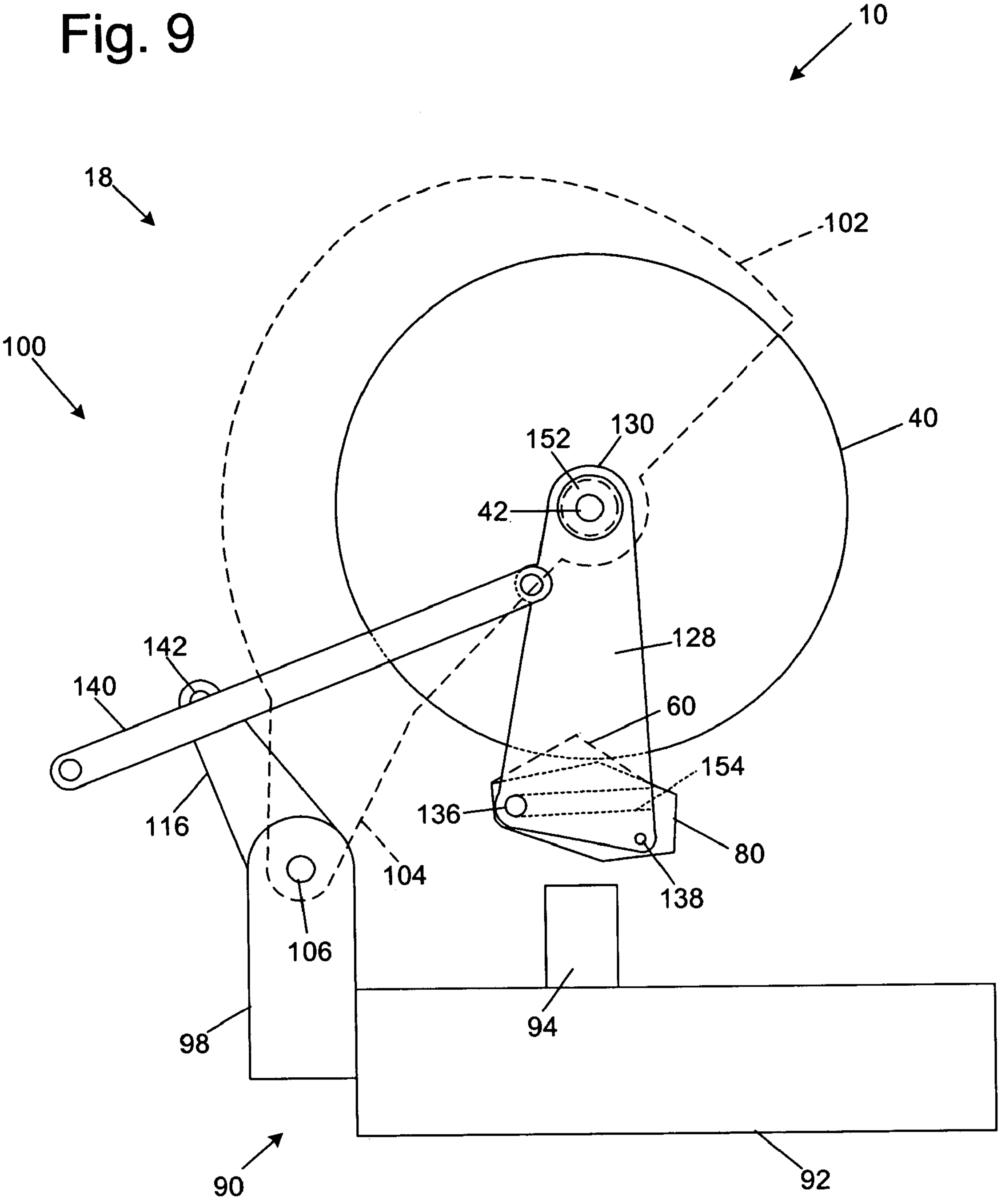
FIG. 9 is similar to FIG. 6 but shows the radial support arms uncoupled from the brace member to pivot the cartridge below the housing for replacement.

Once the brake pawl has engaged and stopped the blade, pivot arm assembly 100 is free to pivot about pivot coupling 106. Housing 102 may include a removable portion through which the cartridge can be replaced. Alternatively, the radial support arms may be uncoupled from brace member 116, as shown in FIG. 9. In the exemplary embodiment, the support arms are uncoupled from the brace member by disconnecting linkages 140 from pivot pin 142. Since the brake pawl usually is wedged onto the blade after being triggered, blade 40 may be rotated until the cartridge is exposed below the housing. Pivot pin 136 and positioning pin 138 may then be removed. Alternatively, positioning pin 138 may be dual spring-loaded pins which can be depressed to disengage the radial support arms. As further alternative, the interior surfaces of radial support arms 128 may include recessed channels 154 adapted to allow pivot pin 136 to slide into place. Position pin(s) 138 may then be installed to hold the cartridge in the operable position relative to the blade. After the used cartridge is replaced with a new cartridge, the cartridge and support arms are pivoted up into the housing and the linkages are reconnected to pivot pin 142. When removing or installing the blade, arbor nut 150 may be accessed through an opening 152 in the housing.

Figure 10:
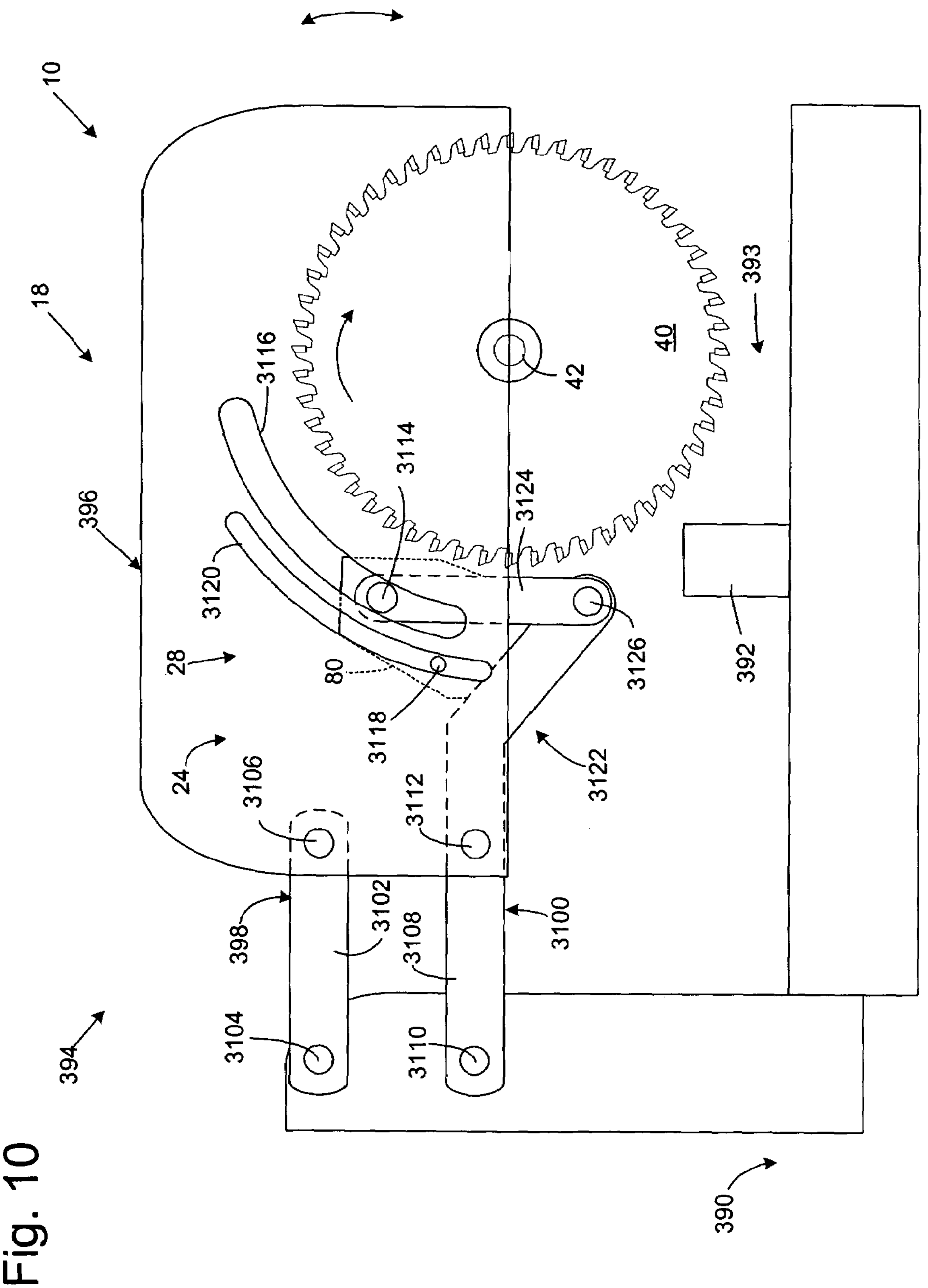
FIG. 10 is a schematic side elevation of another exemplary miter saw having a safety system configured to stop both the rotation and downward movement of the blade.
Figure 11:
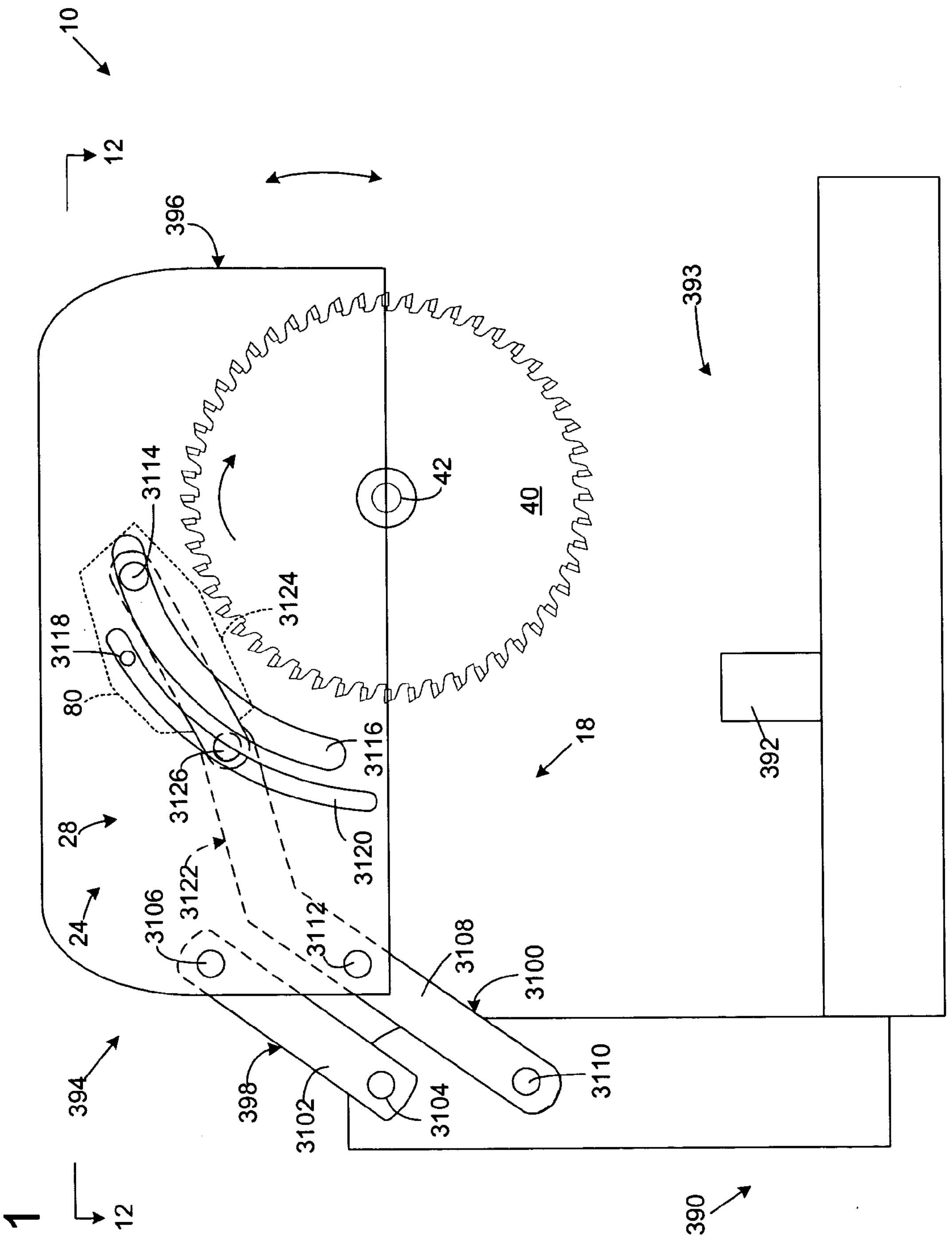
FIG. 11 is similar to FIG. 10 but shows the pivot arm assembly pivoted upward.
Figure 12:
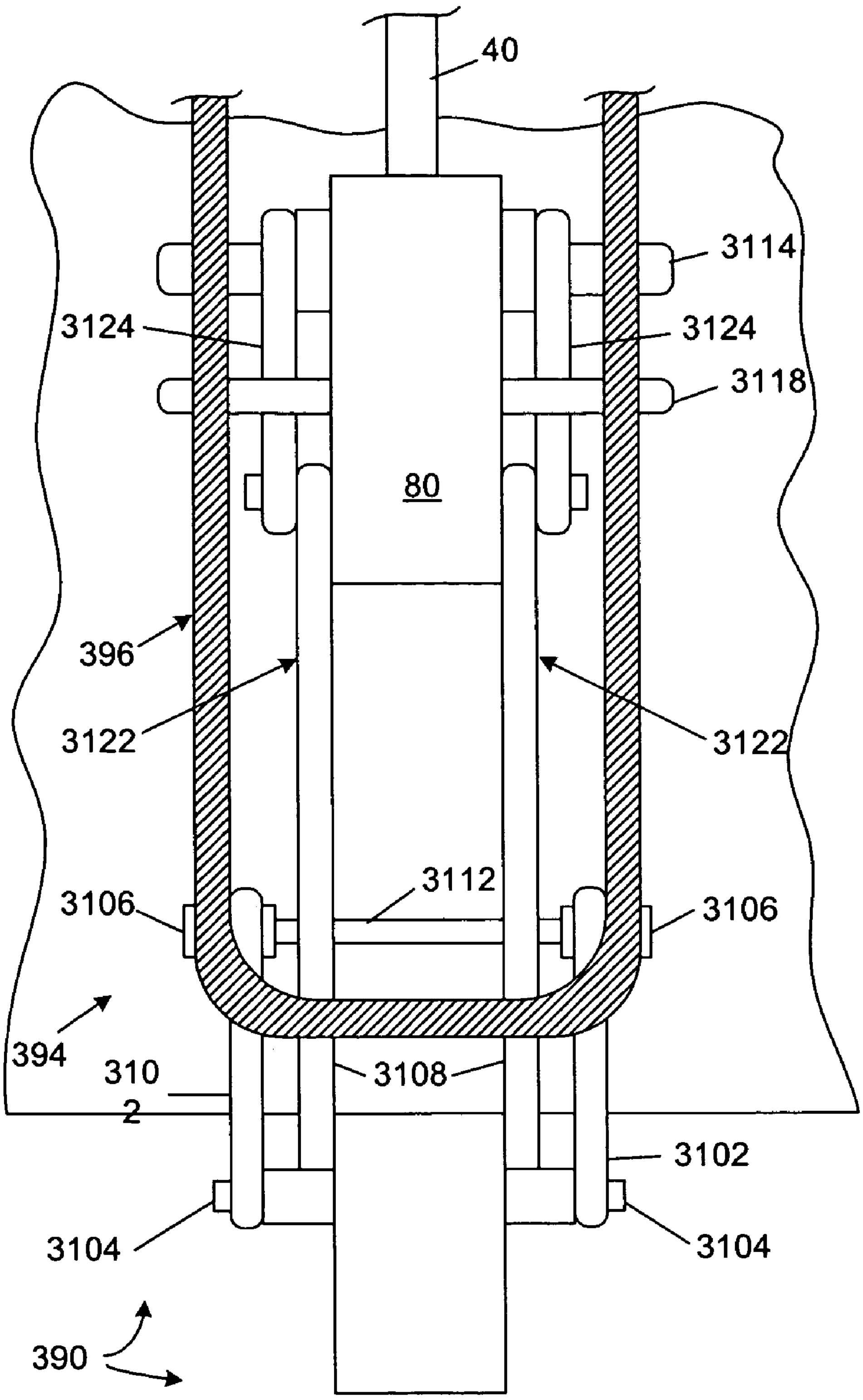
FIG. 12 is a schematic cross-sectional view taken generally along the line 12-12 in FIG. 11.

Turning attention now to FIGS. 10-13, another alternative embodiment is illustrated in which reaction subsystem 24 is configured to stop both the rotation and downward movement of blade 40. Exemplary miter saw 10 includes a base assembly 390 adapted to support a workpiece during cutting. Typically, one or more fences 392 are mounted on base assembly 390 and adapted to prevent workpieces from shifting across the base assembly during cutting. Base assembly 390 and fences 392 define a cutting zone 393 in which workpieces may be cut. The miter saw also includes a blade 40 mounted on an arbor 42. The arbor is driven by a motor assembly (not shown) which is supported above base assembly 390 by a pivot arm assembly 394. As shown in FIGS. 10 and 11, the pivot arm assembly is pivotal toward and away from cutting zone 393 to cut workpieces with the blade. In addition, some portion of the base assembly may be adjustable to tilt the blade relative to the workpiece to perform beveled cuts.

Pivot arm assembly 394 includes a housing 396 pivotally coupled to the base assembly by a first linkage assembly 398 and a second linkage assembly 3100 vertically spaced-apart from the first linkage assembly. First linkage assembly 398 includes a pair of elongate arms 3102 each connected at one end to one or more pivot pins 3104 mounted in the base assembly, and at the opposite end to one or more pivot pins 3106 mounted in housing 396. Similarly, second linkage assembly 3100 includes a pair of elongate arms 3108 each connected at one end to one or more pivot pins 3110 mounted in the base assembly. A generally central portion of each arm 3108 is connected to one or more pivot pins 3112 mounted in housing 396. Arms 3102 and 3108 may be constructed of any suitable material adapted to support the weight of the housing, motor assembly, blade, etc., including metal, plastic, etc. Typically, pivot arm assembly 394 includes a spring or other biasing mechanism (not shown) adapted to maintain the housing in a fully upward position away from cutting zone 393 when the miter saw is not in use.

As shown in FIGS. 10 and 11, pivot pins 3104 are vertically aligned with pivot pins 3110, while pivot pins 3106 are vertically aligned with pivot pins 3112. Additionally, the vertical spacing between pivot pins 3104 and 3110 is substantially equal to the vertical spacing between pivot pins 3106 and 3112. As a result, housing 396 pivots toward and away from cutting zone 393 while maintaining a constant orientation in relation to the base assembly. In other words, the first and second linkage assemblies are configured to pivot housing 396 without causing the housing to rotate relative to the base assembly.

Reaction subsystem 24 includes a brake mechanism 28 having at least one brake pawl 60 housed in a replaceable cartridge 80. The cartridge and brake pawl are mounted on a movable pivot pin 3114 configured to slide within a first set of channels 3116 in either side of housing 396. First channels 3116 define concentric arcs about arbor 42. As a result, pivot pin 3114 is maintained at a constant radius from the arbor as it slides within first channels 3116. A positioning pin 3118 extends from one or both sides of cartridge 80 to slide within a second set of channels 3120. The second set of channels also define concentric arcs about arbor 42 so that positioning pin 3118 maintains a constant radius from the arbor as it slides within the second set of channels. Since the brake pawl is housed in cartridge 80, both the cartridge and brake pawl are maintained in a constant orientation relative to the arbor and the perimeter of the blade as pivot pin 3114 slides within first channels 3116. Additionally, the cartridge and brake pawl tilt with the housing when the miter saw is adjusted to make bevel cuts.

Cartridge 80 typically includes a restraining mechanism adapted to hold the brake pawl away from the blade against the urging of a biasing mechanism. In response to an activation signal, a release mechanism releases the brake pawl from the restraining mechanism to pivot into the blade, usually stopping the blade within approximately 2-5 milliseconds. Exemplary restraining mechanisms, biasing mechanisms, release mechanisms, cartridges and brake pawls are described in more detail above and in the incorporated references. In alternative embodiments, the cartridge may be omitted.

Housing 396 may include a removable section through which the cartridge may be installed or removed. Pivot pin 3114 is typically removed by sliding it completely through the cartridge, thereby releasing the cartridge and brake pawl. Positioning pin 3118 may also be slid completely through the cartridge. Alternatively, positioning pin 3118 may be dual spring-loaded pins which can be depressed generally flush with the side of the cartridge to allow the cartridge to be installed and removed more easily. Optionally, housing 396 may include one or more removable covers adapted to cover one or both of the first and second set of channels during normal operation. It will be appreciated that cartridge 80 and housing 394 may be configured in any of a variety of different ways to allow the cartridge to be easily installed or removed.

Arms 3108 include distal portions 3122 spaced apart from pivot pins 3110 and extending toward blade. 40. As housing 396 is pivoted downward toward the workpiece, distal portions 3122 pivot downward relative to the blade. Likewise, when housing 396 is pivoted upward away from the workpiece, distal portions 3122 pivot upward relative to the blade. Pivot pin 3114 is coupled to second linkage assembly 3100 by a pair of links 3124. The lower end of each link 3124 is coupled to the distal portion of one of arms 3108 by a pivot coupling 3126, while the upper end of each link is pivotally coupled to pivot pin 3114. Thus, pivot pin 3114 is pushed or pulled along first set of channels 3116 as distal portions 3122 pivot relative to the blade. Links 3124 may be constructed of any suitable material including metal, plastic, etc.

Figure 13:
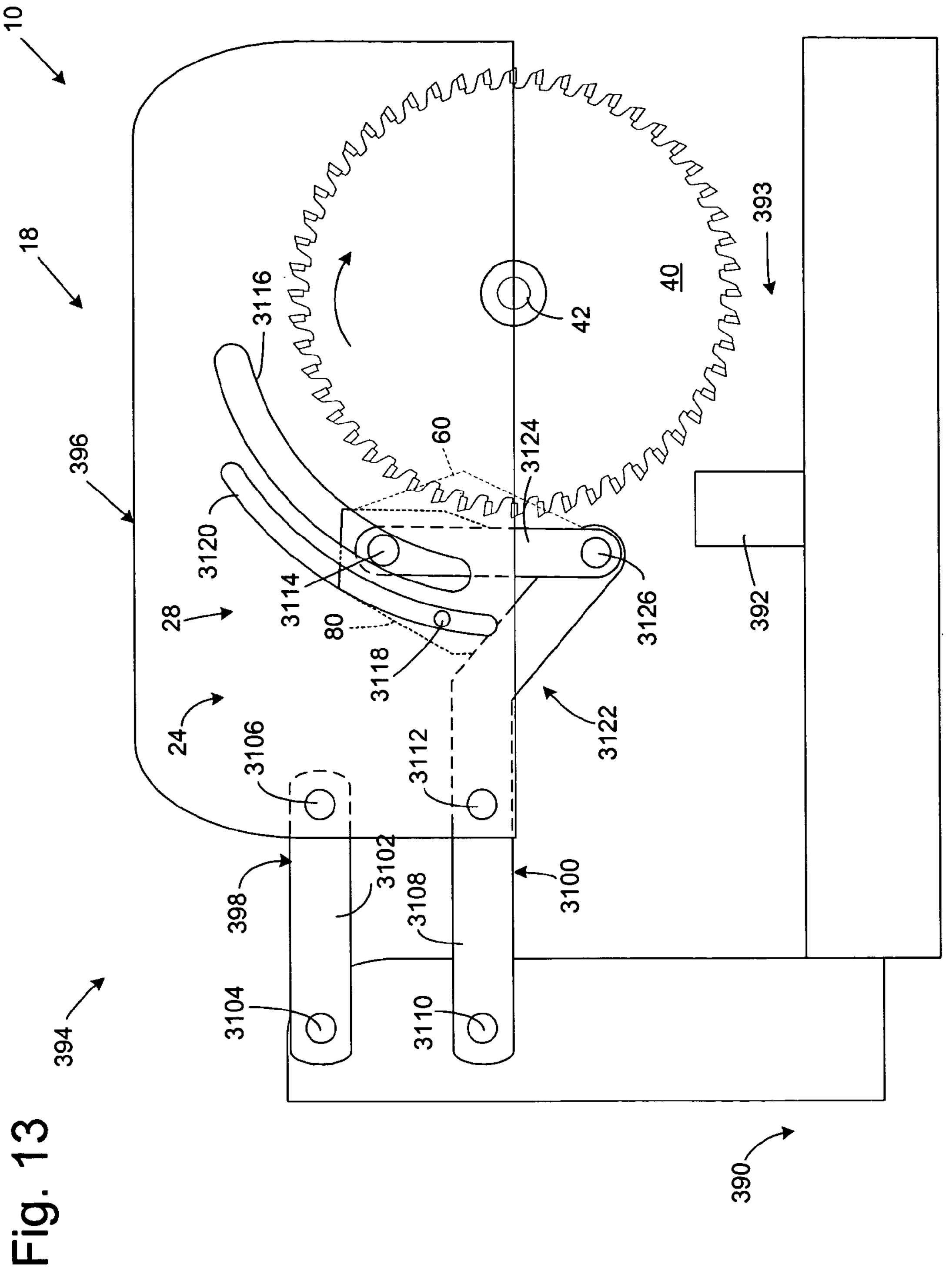
FIG. 13 is similar to FIG. 10 but shows the brake pawl engaging the blade.

As can be seen by comparing FIGS. 10 and 11, the cartridge and brake pawl pivot or revolve about the center of blade 40 as second linkage assembly 3100 pivots about pivot pin 3110. The cartridge and brake pawl also can be seen as pivoting around the center of the blade as housing 396 pivots toward and away from the workpiece. Moreover, the cartridge and brake pawl are configured to pivot in a direction counter to the pivot direction of second linkage assembly 3100 and housing 396. In other words, the cartridge and brake pawl pivot about the center of the blade in a counter-clockwise direction (as seen in FIG. 13) when the first linkage assembly and housing pivot about pivot pin 3110 in a clockwise direction. Conversely, the cartridge and brake pawl pivot about the center of the blade in a clockwise direction (as seen in FIG. 13) when the first linkage assembly and housing pivot about pivot pin 3110 in a counter-clockwise direction.

In response to an activation signal from a control subsystem (not shown), brake pawl 60 is pivoted into the teeth of blade 40, as shown in FIG. 13. When the brake pawl engages the blade the angular momentum of the blade produces a force on the brake pawl that tends to urge the brake pawl to move in a clockwise direction along first set of channels 3116. In other words, at least a portion of the angular momentum of the blade is transferred to the brake pawl. The force on brake pawl 60 is transferred to first linkage assembly 3100 by link 3124. As a result, distal portions 3122 are urged upward relative to the blade, thereby tending to pivot housing 396 in a counter-clockwise direction around pivot pin 3110 and away from cutting zone 393.

The amount of upward force on distal portion 3122 will depend on the ratio of the distance between couplings 3112 and 3126, and the distance between couplings 3110 and 3112. As the distance between couplings 3112 and 3126 is increased relative to the distance between couplings 3110 and 3112, the moment of any upward force at coupling 3126 is increased. Typically, couplings 3110, 3112 and 3126 are arranged so that the moment of the upward force on distal portion 3122 is sufficient to stop any downward movement of the housing and blade under normal operating conditions (i.e., the housing is pivoted downward toward the cutting zone at a normal speed). Optionally, the couplings may be arranged so that the moment of the upward force on distal portion 3122 is sufficient to overcome and reverse normal downward movement of the housing and blade, thereby retracting the blade upward away from cutting zone 393. In any event, brake pawl 60 is arranged to convert at least a portion of the kinetic energy of the rotating blade into an upward force on the housing and blade. Thus, exemplary brake mechanism 28 is configured to stop both rotation of the blade and any downward movement of the blade using a single brake pawl. As a result, only a single cartridge need be replaced after the reaction subsystem has been triggered.

Since the upward force on the housing is produced by the rapid deceleration of the blade, the upward force on the housing is only temporary. Once the rotation of the blade has stopped, the housing is free to pivot toward or away from the cutting zone. Nevertheless, the blade will remain locked against further rotation until the cartridge is removed.

It will be appreciated that while one particular embodiment has been described above, many modifications and alterations are possible. As one example, brake pawl 60 and cartridge 80 may be coupled to distal portions of first linkage assembly 398 rather than second linkage assembly 3100. As another example, second set of channels 3120 may be eliminated and positioning pin 3118 may be positioned on the cartridge to slide within the first set of channels 3116. As a further example, the first and/or second set of channels may be formed in only a single side of housing 396, in which case pivot pin 3114 and/or positioning pin 3118 extend through only a single side of the housing. In view of the many modifications and alterations which are possible, it will be understood that the scope of the invention is not limited to the particular embodiments described herein but includes all such modifications and alterations.

As described above, the present invention provides a miter saw which is substantially safer than existing saws. The miter saw includes a safety system 18 adapted to detect the occurrence of a dangerous condition and stop movement of the blade and/or the pivot arm to prevent serious injury to a user. Alternatively, the safety system may be adapted for use on a variety of other saws in addition to miter saws. Several examples of such modifications and variations, as well as further detailed descriptions of miter saws and other saws may be found in the following references, the disclosures of which are herein incorporated by reference: PCT Patent Application Ser. No. PCT/US00/26812, filed Sep. 29, 2000; U.S. patent application Ser. No. 09/676,190, filed Sep. 29, 2000; U.S. Provisional Patent Application Ser. No. 60/275,595, filed Mar. 13, 2001; U.S. Provisional Patent Application Ser. No. 60/273,177, filed Mar. 2, 2001; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A saw comprising:

a base assembly;

a housing pivotally coupled to the base assembly;

a substantially planar, circular blade supported at least partially within the housing, where the blade has a cutting edge around its periphery;

a motor configured to rotate the blade; and a safety system including at least one brake member adapted to engage and stop the rotation of the blade;

where the brake member is coupled to the housing by support structure that includes at least one pivot pin disposed at least partially within the housing and radially beyond the cutting edge of the blade, where the pivot pin extends substantially perpendicular to the plane of the blade, where the brake member includes an aperture, and where the pivot pin passes through the aperture to mount the brake member on the pivot pin.

2. The saw of claim 1, where the housing includes an outer wall, and where the at least one pivot pin extends at least partially through the outer wall of the housing.

3. The saw of claim 1, where the housing includes an outer wall, and where the outer wall supports the at least one pivot pin.

4. The saw of claim 1, where the pivot pin includes two ends and where the pivot pin is supported at each of its two ends.

5. The saw of claim 1, where the pivot pin is positioned in a slot in the housing.

6. The saw of claim 1, where the pivot pin is moveable relative to the housing.

7. The saw of claim 1, where the pivot pin is moveable relative to the blade.

8. A saw comprising:

a base assembly;

a housing pivotally coupled to the base assemby;

a substantially planar, circular blade supported at least partially within the housing, where the blade has a cutting edge around its periphery;

a motor configured to rotate the blade; and a safety system including at least one brake member adapted to engage and stop the rotation of the blade;

where the brake member is coupled to the housing by support structure that includes at least one pivot pin disposed at least partially within the housing and radially beyond the cutting edge of the blade, where the pivot pin extends substantially perpendicular to the plane of the blade, where the brake member includes an aperture, and where the pivot pin passes through the aperture to mount the brake member on the pivot pin; and where the pivot pin is moveable around the perimeter of the blade.

9. A saw comprising:

a base assembly;

a housing pivotally coupled to the base assembly;

a substantially planar, circular blade supported at least partially within the housing, where the blade has a cutting edge around its periphery;

a motor configured to rotate the blade;

a pivot pin supported by the housing radially beyond the cutting edge of the blade, where the pivot pin extends substantially perpendicular to the plane of the blade; and a safety system including at least one brake member adapted to engage and stop the rotation of the blade, where the brake member has an aperture, and where the pivot pin extends through the aperture to mount the brake member on the pivot pin.

10. The saw of claim 9, where the housing includes an outer wall, and where the pivot pin extends at least partially through the outer wall of the housing.

11. The saw of claim 9, where the housing includes an outer wall, and where the outer wall supports the pivot pin.

12. The saw of claim 9, where the pivot pin includes two ends and where the pivot pin is supported at each of its two ends.

13. The saw of claim 9, where the pivot pin is positioned in a slot in the housing.

14. The saw of claim 9, where the pivot pin is moveable relative to the housing.

15. The saw of claim 9, where the pivot pin is moveable relative to the blade.

16. A saw comprising:

a base assembly;

a housing pivotally coupled to the base assembly;

a substantially planar, circular blade supported at least partially within the housing, where the blade has a cutting edge around its periphery;

a motor configured to rotate the blade;

a pivot pin supported by the housing radially beyond the cutting edge of the blade, where the pivot pin extends substantially perpendicular to the plane of the blade; and a safety system including at least one brake member adapted to engage and stop the rotation of the blade, where the brake member has an aperture, and where the pivot pin extends through the aperture to mount the brake member on the pivot pin;

where the pivot pin is moveable around the perimeter of the blade.

* * * * *